US010843213B2

(12) United States Patent
Kahler et al.

(10) Patent No.: US 10,843,213 B2
(45) Date of Patent: Nov. 24, 2020

(54) FLUID DISPENSING METER AUTHORIZATION

(71) Applicant: Graco Minnesota Inc., Minneapolis, MN (US)

(72) Inventors: Bradley G. Kahler, Otsego, MN (US); Mark L. Bauck, Coon Rapids, MN (US); Joshua R. Holmstadt, St. Michael, MN (US); Glenn E. Highland, East Bethel, MN (US); Benjamin J. Paar, Minneapolis, MN (US); Chad G. Igo, Minneapolis, MN (US)

(73) Assignee: Graco Minnesota Inc., Minneapolis, MN (US)

(*) Notice: Subject to any disclaimer, the term of this patent is extended or adjusted under 35 U.S.C. 154(b) by 0 days.

(21) Appl. No.: 16/156,765

(22) Filed: Oct. 10, 2018

(65) Prior Publication Data

US 2019/0105676 A1   Apr. 11, 2019

Related U.S. Application Data

(60) Provisional application No. 62/570,141, filed on Oct. 10, 2017, provisional application No. 62/689,606, filed on Jun. 25, 2018.

(51) Int. Cl.
*B67D 7/14* (2010.01)
*B67D 7/04* (2010.01)
(Continued)

(52) U.S. Cl.
CPC ............ *B05B 11/0005* (2013.01); *B67D 7/04* (2013.01); *B67D 7/145* (2013.01); *B67D 7/344* (2013.01);
(Continued)

(58) Field of Classification Search
CPC ..... B05B 11/005; B05B 11/0005; B67D 7/04; B67D 7/145; B67D 7/346; B67D 7/348;
(Continued)

(56) References Cited

U.S. PATENT DOCUMENTS 4,469,149 A    9/1984  Walkey et al.
5,923,572 A    7/1999  Pollock
(Continued)

FOREIGN PATENT DOCUMENTS

JP    H08301396 A    11/1996
KR    20100068137 A    6/2010
(Continued)

OTHER PUBLICATIONS

International Report on Patentiblity for PCT Application No. PCT/US2018/023858, Dated Sep. 24, 2019, pp. 15.

(Continued)

*Primary Examiner* — Dionne Pendleton
(74) *Attorney, Agent, or Firm* — Kinney & Lange, P.A.

(57) ABSTRACT

A fluid management system includes an authentication device and a fluid dispensing meter, and the fluid dispensing meter includes a processor and a memory. The authentication device is configured to provide data to the processor. The processor is configured to recall information from the memory, to compare the information to the data received from the authenticator, and to control a trigger control mechanism between the activated state and the deactivated state based on the comparison.

13 Claims, 12 Drawing Sheets

(51) Int. Cl.
*B67D 7/34* (2010.01)
*G05B 19/042* (2006.01)
*B05B 11/00* (2006.01)
*G05D 7/06* (2006.01)
*G07C 9/00* (2020.01)
*B67D 7/42* (2010.01)

(52) U.S. Cl.
CPC .............. *B67D 7/346* (2013.01); *B67D 7/348* (2013.01); *B67D 7/425* (2013.01); *G05B 19/042* (2013.01); *G05D 7/0617* (2013.01); *G07C 9/00896* (2013.01); *B67D 7/34* (2013.01)

(58) Field of Classification Search
CPC .......... B67D 7/425; B67D 2210/00128; B67D 7/72; G05D 7/0617; G05D 7/0635; E03F 7/02; G01L 19/12; G07C 9/00896; G08B 21/02; G08B 21/0469; G08B 21/08; G08B 21/084; G08B 21/18; G08B 23/00; G08B 25/016; G08B 25/10; G08B 5/002; G08B 5/36; G06F 19/3418; G06F 19/00; G06F 19/3468; G06F 19/3481; A23C 13/12; A23C 2210/30; A23C 2240/20; A23G 9/00; A23P 30/40; A47J 43/12; A61B 2503/10; A61B 2560/0223; A61B 2562/0219; A61B 2562/12; A61B 5/0002; A61B 5/1118; A61B 5/14503; A61B 5/14532; A61B 5/14546; A61B 5/1495; A61B 5/4875; A61B 5/6887; A61B 5/6895; A61B 5/7455; A61M 1/1603; A61M 2005/14208; A61M 2005/14268; A61M 2005/1586; A61M 2205/3306; A61M 2205/3334; A61M 2205/3515; A61M 2205/3569; A61M 2205/3576; A61M 2205/50; A61M 39/284; A61M 5/1411; A61M 5/14244; A61M 5/14546; A61M 5/1456; A61M 5/14566; A61M 5/158; A61M 5/16804; A61M 5/16877; A61M 5/16886; A61M 5/1689; A61M 5/172; B65D 83/14; B65D 83/224; F16K 27/00; G01F 1/661; G05B 15/02; G05B 2219/31197; G06K 9/2027; G06K 9/40; G06K 9/52; G06K 9/6201; G06K 9/6215; G06T 2207/20182; G06T 2207/20224; G06T 2207/30004; G06T 2207/30232; G06T 3/0093; G06T 5/002; G06T 5/50; G06T 7/0012; G06T 7/20; G06T 7/60; G16H 10/60; G16H 20/17; G16H 20/30; G16H 40/63; G16H 40/67; H04N 7/183
See application file for complete search history.

(56) References Cited

U.S. PATENT DOCUMENTS

| | | | |
|---|---|---|---|
| 6,571,151 B1 | 5/2003 | Leatherman | |
| 6,585,009 B2 | 7/2003 | Matthews et al. | |
| 6,659,306 B2 | 12/2003 | Boyle et al. | |
| 7,082,969 B1 | 8/2006 | Hollerback | |
| 7,096,894 B1 | 8/2006 | Hollub et al. | |
| 7,551,087 B2 | 6/2009 | McAllister | |
| 7,647,954 B2 | 1/2010 | Garber et al. | |
| 7,778,600 B2 | 8/2010 | Godwin et al. | |
| 8,037,844 B2 | 10/2011 | Mather et al. | |
| 8,429,095 B1 | 4/2013 | Ryan | |
| 8,816,860 B2 | 8/2014 | Ophardt et al. | |
| 8,833,607 B2 | 9/2014 | Wegelin et al. | |
| 8,994,529 B2 | 3/2015 | White | |
| 9,053,503 B2 | 6/2015 | Carapelli | |
| 9,227,209 B2 | 1/2016 | Mather et al. | |
| 9,516,141 B2 | 12/2016 | Dubois et al. | |
| 9,558,486 B2 | 1/2017 | Betancourt | |
| 9,715,682 B2 | 1/2017 | Webb et al. | |
| 9,649,651 B2 | 5/2017 | Mather et al. | |
| 2002/0188382 A1 | 12/2002 | Sherwood | |
| 2006/0121844 A1 | 6/2006 | Sparks, II | |
| 2006/0139169 A1 | 6/2006 | Reid et al. | |
| 2006/0157149 A1 | 7/2006 | Hillam et al. | |
| 2007/0056983 A1 | 3/2007 | Wells | |
| 2009/0314797 A1 | 12/2009 | Breeser | |
| 2010/0200609 A1 | 8/2010 | Cadigan | |
| 2011/0166689 A1 | 7/2011 | Alden et al. | |
| 2011/0172816 A1 | 7/2011 | Ezra | |
| 2011/0245983 A1 | 10/2011 | Beebe | |
| 2013/0103585 A1 | 4/2013 | Carapelli | |
| 2013/0206279 A1 | 8/2013 | Ryan | |
| 2015/0025498 A1* | 1/2015 | Estes | G16H 20/17 604/506 |
| 2015/0120476 A1 | 4/2015 | Harrell | |
| 2015/0161590 A1 | 6/2015 | Genovez | |
| 2015/0375984 A1 | 12/2015 | Arcand | |
| 2016/0023886 A1* | 1/2016 | Braden | B67D 7/348 141/94 |
| 2016/0121352 A1 | 5/2016 | Mather et al. | |
| 2017/0073211 A1* | 3/2017 | Wilson | B67D 7/04 |
| 2017/0109722 A1 | 4/2017 | Morris et al. | |
| 2017/0178257 A1 | 6/2017 | Tingler et al. | |
| 2017/0221116 A1 | 8/2017 | Makke et al. | |
| 2017/0247241 A1 | 8/2017 | Blyth | |
| 2017/0287237 A1* | 10/2017 | Koenig | G07C 5/008 |
| 2017/0335988 A1* | 11/2017 | Peret | G06T 5/002 |
| 2019/0274598 A1* | 9/2019 | Scott | A61B 5/14503 |
| 2019/0367353 A1* | 12/2019 | McNamara | B67D 7/04 |

FOREIGN PATENT DOCUMENTS

| | | |
|---|---|---|
| WO | WO2005045536 A2 | 5/2005 |
| WO | WO2015066193 A1 | 5/2015 |

OTHER PUBLICATIONS

International Report on Patentiblity for PCT Application No. PCT/US2018/023861, Dated Sep. 24, 2019, pp. 10.
International Preliminary Report on Patentability for PCT Application No. PCT/US2018/055237, Dated Apr. 23, 2020, pp. 8.
International Search Report and Written Opinion for PCT Application No. PCT/US2018/055237, Dated Jan. 28, 2019, pp. 12.
International Search Report and Written Opinion for PCT Application No. PCT/US2018/023858, Dated Jul. 9, 2018, pp. 16.
Third Party Observation from PCT Application No. PCT/US2018/023861, Dated Feb. 4, 2019, pp. 2.
International Search Report for PCT Application No. PCT/US2018/023861, Dated Jul. 10, 2018, pp. 13.

* cited by examiner

FLUID DISPENSING METER AUTHORIZATION

CROSS-REFERENCE TO RELATED APPLICATION(S)

This application claims the benefit of U.S. Provisional Application No. 62/570,141, filed Oct. 10, 2017, and entitled "DISPENSING METER AUTHORIZATION"; and to U.S. Provisional Application No. 62/689,606, filed Jun. 25, 2018, and entitled "FLUID DISPENSING METER WORK ORDER," the disclosures of which are hereby incorporated by reference in their entirety.

BACKGROUND

The present disclosure relates to fluid dispensing. More particularly, this disclosure relates to fluid dispensing meters.

Fluid management has become increasingly important to control the costs of fluid overhead. For example, many vehicle fleet managers and auto dealerships have installed fluid management systems to efficiently dispense fluids, such as motor oil or transmission fluid. Such fluid management systems frequently include a fluid tank and pump located away from the dispensing point. Fluid management systems can include wireless transmission and reception of meter and tank level information to simplify tracking of fluid dispenses throughout an entire facility.

A fluid dispensing meter, also referred to as a metered valve or metering valve, can have different trigger designs. For example, a fluid dispensing meter can have a manual trigger or a pre-set fluid dispensing meter, which has a manual trigger but has the added functionality of automatically stopping a fluid dispense when a pre-set fluid dispense volume has been reached. Fluid dispensing meters can have the additional ability of preventing fluid dispenses until the meter has received dispense authorization via an RF signal that activates the trigger mechanism. The fluid dispensing meter can include a trigger actuation solenoid that controls activation of the trigger mechanism.

The fluid dispensing meter can require a user to enter a PIN code to authorize activation of the trigger mechanism by the solenoid. Current fluid management systems require the user to enter a PIN code on the meter interface to activate the meter, identify the technician, and perform a fluid dispense. Similarly, the user is required to enter a work order number or scroll through a list of work orders on the meter interface screen to select the work order that the dispense is associated with. Both entering a PIN to activate the trigger mechanism and associating a work order with the dispense event are cumbersome and time consuming.

The fluid dispensing meter can also require that the work order and the fluid dispense parameters associated with the work order (e.g., amount of fluid to be dispensed, type of fluid, etc.) be sent to the fluid dispensing meter over a Wi-Fi network. Current fluid management systems create a work order in a database, which is then transmitted to the metered valve over the Wi-Fi network. Typically, the user is required to enter a work order number using the keypad of the fluid dispensing meter or to scroll through a list of work orders on the meter interface screen to select the appropriate work order for that dispense event. Both entering a PIN to activate the trigger mechanism and associating a work order with the dispense event are cumbersome and time consuming. Further, a Wi-Fi or similar network may not be available, practical to install, and/or economical.

SUMMARY

According to one aspect of the present disclosure, a fluid dispensing meter includes a trigger control mechanism, a data receiver, and a control board. The trigger control mechanism is mounted in a body of the fluid dispensing meter and is controllable between an activated state, where the fluid dispensing meter can dispense fluid, and a deactivated state, where the fluid dispensing meter is prevented from dispensing fluid. The data receiver is mounted on the fluid dispensing meter and is configured to receive data from an external data source. The control board includes a processor, and a memory encoded with instructions that, when executed by the processor, cause the processor to recall approved user identities from the memory, to compare the approved user identities to user-identification data received from an external data source, and to control the trigger control mechanism between the activated state and the deactivated state based on the comparison of the user-identification data and the approved user identities.

According to another aspect of the present disclosure, a fluid management system includes an external data source configured to generate a user-identification signal that includes user-identification data, and a fluid dispensing meter. The fluid dispensing meter includes a trigger control mechanism, a data receiver, and a control board. The trigger control mechanism is mounted in a body of the fluid dispensing meter and is controllable between an activated state, where the fluid dispensing meter can dispense fluid, and a deactivated state, where the fluid dispensing meter is prevented from dispensing fluid. The data receiver is mounted on the fluid dispensing meter and is configured to receive data from the external data source. The control board includes a processor, and a memory encoded with instructions that, when executed by the processor, cause the processor to recall approved user identities from the memory, to compare the approved user identities to user-identification data received from an external data source, and to control the trigger control mechanism between the activated state and the deactivated state based on the comparison of the user-identification data and the approved user identities.

According to yet another aspect of the present disclosure, a method of authorizing a fluid dispense includes receiving user-identification data at a processor of a fluid dispensing meter, the user-identification data configured to identify a user; recalling, from a memory of the fluid dispensing meter, a list of authorized users and comparing, with the processor, the user-identification data and the list of authorized users; determining, with the processor, an authorization status of the user based on the comparison of the user-identification data and the list of authorized users; and controlling, with the processor, a trigger control mechanism of the fluid dispensing meter between an activated state and a deactivated state based on the authorization status of the user.

According to yet another aspect of the present disclosure, a fluid dispensing meter includes a trigger control mechanism mounted in a body of the fluid dispensing meter, a near field communications (NFC) data receiver mounted on the fluid dispensing meter, and a control board disposed within a bezel housing mounted on the fluid dispensing meter. The trigger control mechanism is controllable between an activated state, where the fluid dispensing meter can dispense fluid, and a deactivated state, where the fluid dispensing meter is prevented from dispensing fluid. The NFC data receiver configured to receive data from an external data source. The control board includes a processor; and a memory encoded with instructions that, when executed by the processor, cause the processor to control the trigger control mechanism between the activated state and the deactivated state based on the data received from the external data source.

According to another aspect of the present disclosure, a fluid management system includes a near field communication (NFC) programming unit; an NFC data source, the NFC data source configured to receive dispense data from the NFC programming unit; and a fluid dispensing meter. The fluid dispensing meter includes a trigger control mechanism mounted in a body of the fluid dispensing meter, an NFC data receiver mounted on the fluid dispensing meter; and a control board disposed within a bezel housing mounted on the fluid dispensing meter. The trigger control mechanism is controllable between an activated state, where the fluid dispensing meter can dispense fluid, and a deactivated state, where the fluid dispensing meter is prevented from dispensing fluid. The NFC data receiver configured to receive the dispense data from the NFC data source. The control board includes a processor; and a memory encoded with instructions that, when executed by the processor, cause the processor to control the trigger control mechanism between the activated state and the deactivated state based on the dispense data received from the NFC data source.

According to yet another aspect of the present disclosure, a method of authorizing a fluid dispense includes generating, at a near field communication (NFC) programming unit, dispense-authorization data for a fluid dispense event; writing, by the NFC programming unit, the dispense-authorization data to an NFC data source; placing the NFC data source within an operable range of an NFC receiver disposed on a fluid dispensing meter; providing, by the NFC receiver, the dispense-authorization data to a processor of the fluid dispensing meter; and controlling, with the processor, a trigger control mechanism of the fluid dispensing meter between an activated state and a deactivated state based on the dispense-authorization data.

According to yet another aspect of the present disclosure, a controller is intended for use with a fluid dispensing meter including a trigger control mechanism mounted in a body of the fluid dispensing meter, the trigger control mechanism controllable between an activated state, where the fluid dispensing meter can dispense fluid, and a deactivated state. The controller includes a control board having a processor, and a memory encoded with instructions that, when executed by the processor, cause the processor to control the trigger control mechanism between the activated state and the deactivated state based on dispense data received from an external data source. A near field communication (NFC) data receiver is in communication with the control board, the NFC data receiver is configured to receive the dispense data from the external data source.

DETAILED DESCRIPTION

Figure 1A:
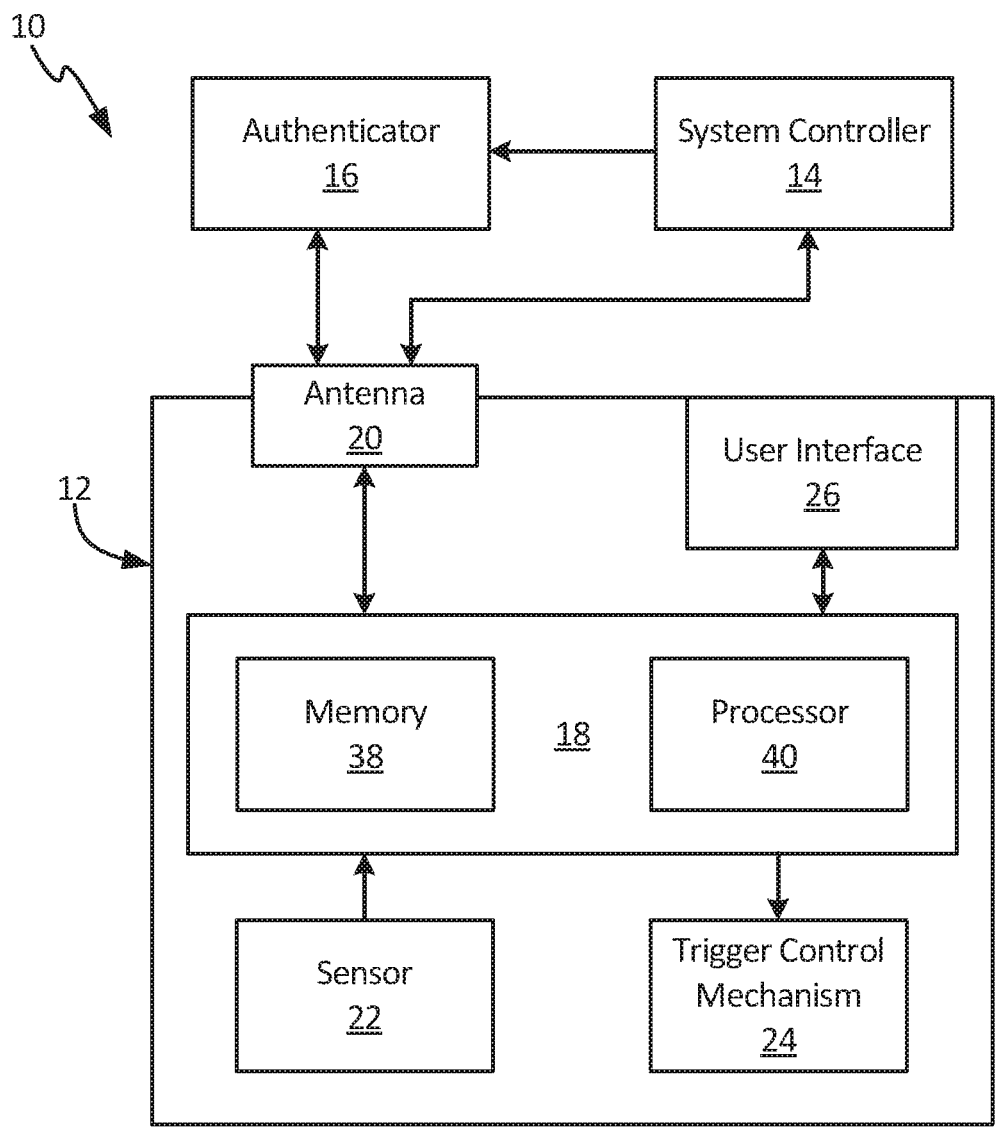
FIG. 1A is a schematic block diagram of a fluid management system.
Figure 1B:
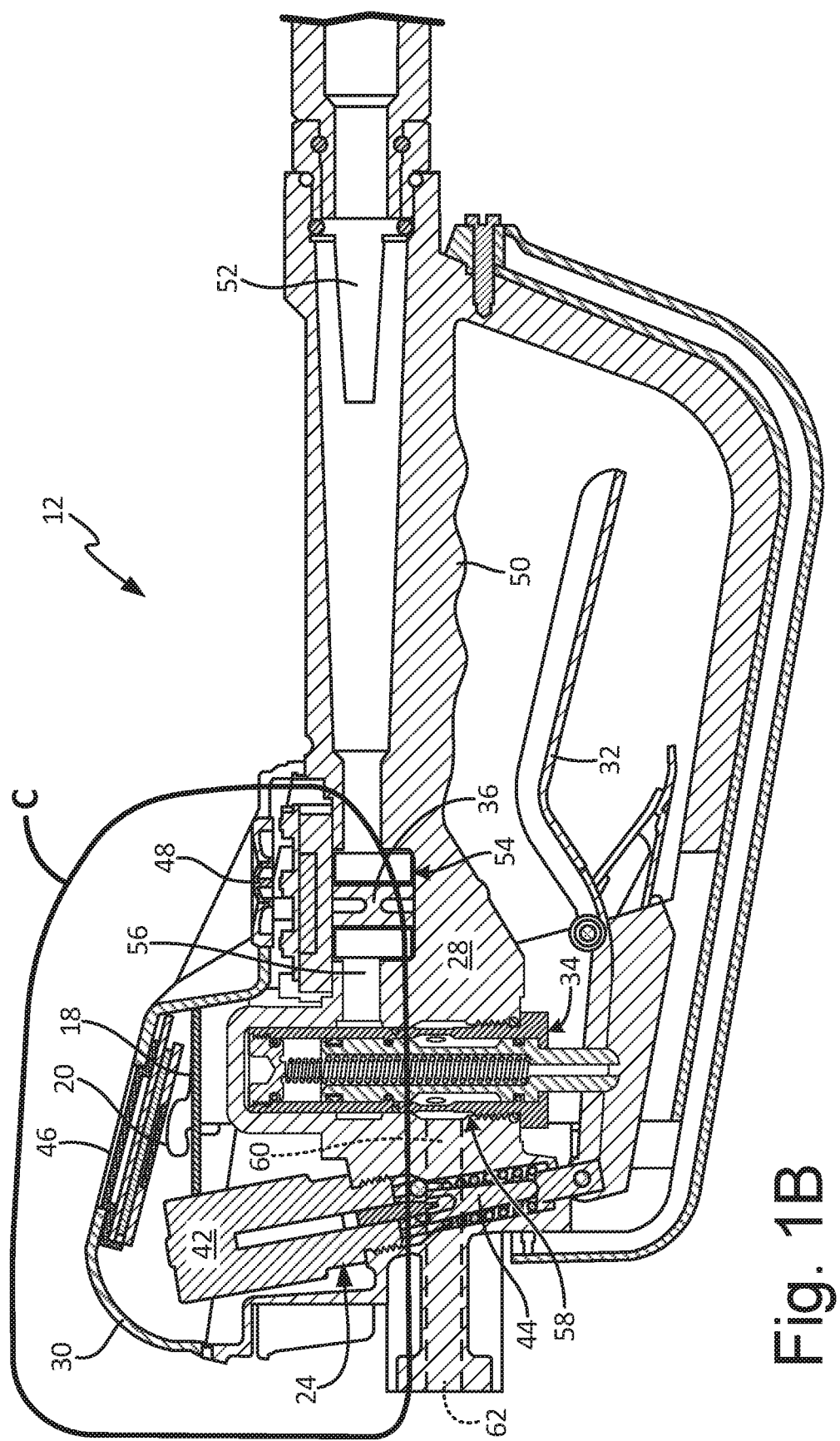
FIG. 1B is a cross-sectional view of a fluid dispensing meter.
Figure 1C:
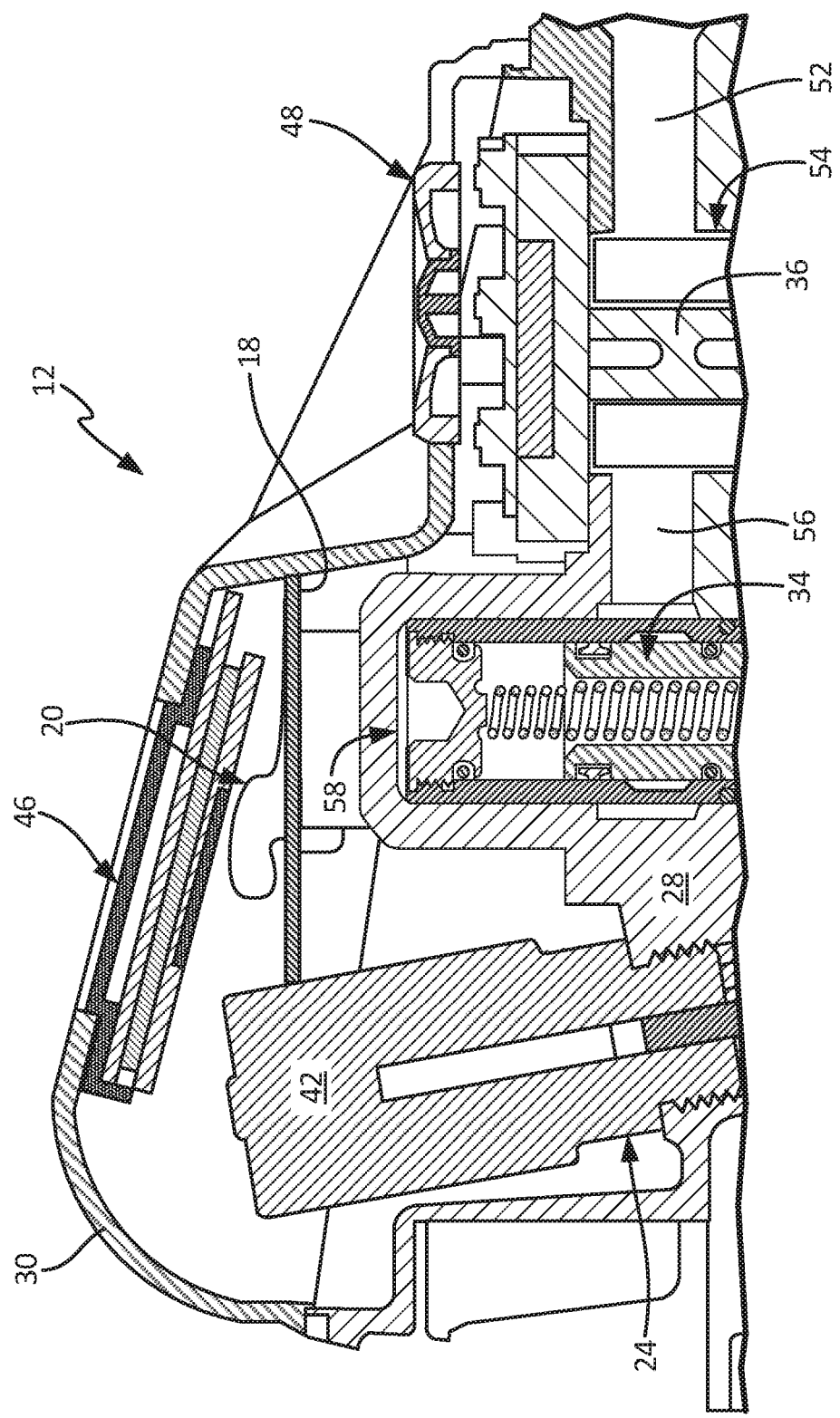
FIG. 1C is an enlarged view of detail Z in FIG. 1B.

FIG. 1A is a schematic block diagram of fluid management system 10. FIG. 1B is a cross-sectional view of fluid dispensing meter 12. FIG. 1C is an enlarged view of detail C in FIG. 1B. FIGS. 1A-1C will be discussed together. Fluid management system 10 includes fluid dispensing meter 12, system controller 14, and authenticator 16. Fluid dispensing meter 12 includes control board 18, antenna 20, sensor 22, trigger control mechanism 24, user interface 26, meter body 28, bezel housing 30, trigger 32, valve 34, and meter 36. Control board 18 includes memory 38 and processor 40. Trigger control mechanism 24 includes solenoid 42, trip rod 44, and balls 45. User interface 26 includes display screen 46 and user input 48. Meter body 28 includes handle 50, fluid inlet 52, metering chamber 54, valve inlet port 56, valve cavity 58, valve outlet port 60, and fluid outlet 62.

Fluid management system 10 is a system for dispensing fluid and tracking fluid dispenses. For example, fluid management system 10 can be implemented in an automotive shop to track dispenses of oil, coolant, and other automotive fluids. Fluid dispensing meter 12 is configured to dispense and meter fluid at various locations within fluid management system 10. Fluid management software is implemented on system controller 14, and system controller 14 is configured to generate work orders, track and record discrete fluid dispense events, and implement system-wide fluid tracking. It is understood that system controller 14 can be any suitable processor-based device for generating work orders and managing fluid data within fluid management system. For example, system controller 14 can be a PC or a mobile device, such as a smart phone, personal data assistant, handheld bill payment machine, and/or a mobile point of sale system.

Bezel housing 30 is mounted on meter body 28 and is configured to enclose the various electronics of fluid dispensing meter 12. Control board 18 is disposed in bezel housing 30 and is in communication with antenna 20, user interface 26, sensor 22, and trigger control mechanism 24. Control board 18 is mounted in bezel housing 30 below antenna 20. Antenna 20 is mounted in bezel housing 30 between control board 18 and display screen 46, and antenna 20 communicates with processor 40. While antenna 20 is described as disposed within bezel housing 30, it is understood that antenna 20 can be mounted at any desired location where antenna 20 can communicate with authenticator 16 and processor 40. For example, antenna 20 can extend through handle 50 or project out of bezel housing 30. Antenna 20 can also be referred to as a data receiver. It is understood, however, that antenna 20 can be configured to both transmit and receive data. Moreover, it is understood that fluid dispensing meter 12 can include one or more antennas 20 configured to utilize different communications standards to facilitate communications between fluid dispensing meter 12 and various devices external to fluid dispensing meter 12.

Memory 38 and processor 40 are mounted on control board 18. While memory 38 and processor 40 are shown on a common control board 18, it is understood that memory 38 and processor 40 can be mounted on separate circuit boards and electrically connected, such as by wiring. Memory 38 stores software that, when executed by processor 40, authorizes fluid dispenses, tracks and records the volume of each fluid dispense, and communicates fluid dispense information to and from the user. User interface 26 is disposed on and in bezel housing 30 and is configured to receive inputs from and provide outputs to the user.

Processor 40, in one example, is configured to implement functionality and/or process instructions. For instance, processor 40 can be capable of processing instructions stored in memory 38. Examples of processor 40 can include any one or more of a microprocessor, a controller, a digital signal processor (DSP), an application specific integrated circuit (ASIC), a field-programmable gate array (FPGA), or other equivalent discrete or integrated logic circuitry. It is understood that, in some examples, processor 40 can be implemented as a plurality of discrete circuitry subassemblies.

Memory 38, in some examples, can be configured to store information during operation. Memory 38, in some examples, is described as computer-readable storage media. In some examples, a computer-readable storage medium can include a non-transitory medium. The term "non-transitory" can indicate that the storage medium is not embodied in a carrier wave or a propagated signal. In some examples, memory 38 is a temporary memory, meaning that a primary purpose of memory 38 is not long-term storage. Memory 38, in some examples, is described as volatile memory, meaning that memory 38 does not maintain stored contents when power to fluid dispensing meter 12 is turned off. Memory 38, in some examples, also includes one or more computer-readable storage media. Memory 38 can be configured to store larger amounts of information than volatile memory. Memory 38 can further be configured for long-term storage of information. In some examples, memory 38 includes non-volatile storage elements.

Handle 50 is configured to be grasped by a single hand of a user, such that the user can manipulate fluid dispensing meter 12 and dispense fluid at a desired location with one hand. Fluid inlet 52 extends into handle 50 and is configured to receive a supply hose extending from a fluid storage tank. Metering chamber 54 is disposed in meter body 28, and meter 36 is disposed in metering chamber 54. Meter 36, in some examples, can be a positive displacement meter configured to generate a volumetric measurement of the fluid flowing through fluid dispensing meter 12. Sensor 22 interfaces with meter 36 and is configured to generate a volumetric flow count based on the volumetric measurement generated by meter 36. Valve inlet port 56 extends between metering chamber 54 and valve cavity 58. Valve 34 is disposed in valve cavity 58 and is configured to control fluid flow through fluid dispensing meter 12. Valve outlet port 60 extends downstream from valve cavity 58. Fluid outlet 62 is configured to receive the fluid flow from valve outlet port 60 and extends out of meter body 28.

Trigger 32 extends from meter body 28 and interfaces with valve 34. Trigger control mechanism 24 is mounted on meter body 28 and is configured to control trigger 32 between an activated state, where trigger 32 can displace valve 34 between a closed position and an open position, and a deactivated state, where trigger 32 is prevented from displacing valve 34 between the closed position and the open position. Solenoid 42 is mounted on meter body 28 and extends into bezel housing 30. Trip rod 44 extends from solenoid 42 and is connected to trigger 32. When trigger control mechanism 24 is activated, solenoid 42 locks trip rod 44 in position, such as with balls 45. With trip rod 44 locked in position, trigger 32 pivots on trip rod 44 such that trigger 32 can displace valve 34 to the open position. When trigger control mechanism 24 is deactivated, solenoid 42 unlocks trip rod 44 such that trip rod 44 is capable of sliding within meter body 28. With trip rod 44 unlocked, trigger 32 cannot pivot on trip rod 44 and instead pivots on valve 34, pulling trip rod 44 downward within meter body 28. As such, trigger 32 is prevented from shifting valve 34 to the open position with trigger control mechanism 24 deactivated. Trigger control mechanism 24 operates substantially similar to the trigger release mechanism disclosed in U.S. Pat. No. 8,215,522, to Graco Minn., Inc., the disclosure of which is hereby incorporated by reference in its entirety.

Authenticator 16, which can also be referred to as an external data source, passively provides dispense-identification data, such as user-identification data that identifies a particular user and/or a group of users, to fluid dispensing meter 12. The dispense-identification data can include the user identity and work orders associated with the user, among other data. The user-identification data is provided to fluid dispensing meter 12 via the communication link between authenticator 16 and antenna 20. As such, authenticator 16 authorizes dispenses and can set fluid limits on dispenses without requiring direct communication between system controller 14 and fluid dispensing meter 12.

In some examples, authenticator 16 is a Near Field Communication ("NFC") device configured to provide the user-identification data to fluid dispensing meter 12. Examples of authenticator 16 can include an NFC-configured wrist band, an NFC-configured ring, an NFC-configured access card, or any other suitable NFC-configured device. Where authenticator 16 is an NFC-enabled device, an NFC tag can be embedded on control board 18. In such an example, antenna 20 can be an NFC tag configured to interact with authenticator 16. While authenticator 16 is described as utilizing NFC to communicate with fluid dispensing meter 12, it is understood that authenticator 16 can additionally or alternatively utilize any desired communication standard to communicate with fluid dispensing meter 12. For example, authenticator 16 can utilize Bluetooth SIG (e.g., Bluetooth 5, Bluetooth low energy protocol stack, Bluetooth Ultra Low Power, etc.), Wibree, BlueZ, Affix, ISO 13157, IEEE 802/Wi Fi, ISO/IEC 15693, ISO/IEC 14443, ISM band, WLAN, active RFID (e.g., Active Reader Active Tag), passive RFID (e.g., Active Reader Passive Tag), NFCIP-1, ISO/IEC 18092, among other options. Antenna 20 can be configured to utilize any communication standard compatible with authenticator 16.

During operation, a work order associated with a discrete fluid dispense event is entered at system controller 14. The work order contains relevant work order information, such as the type of fluid to be dispensed, the volume of fluid to be dispensed, the customer associated with the work order, the desired location of the dispense event, and/or the identities of users authorized to perform the dispense event, among other desired information. In some examples, the work order includes a list of authorized users, which are the users authorized to complete the dispense event identified by the work order. It is understood, however, that the work order can include as much or as little information as desired to facilitate the dispense event. For example, the work order may include only the type and volume of fluid to be dispensed. The work order can be provided to fluid dispensing meter 12 via the communication link between system controller 14 and fluid dispensing meter 12. The work order information can be stored in memory 38.

The user, such as an automotive technician, proceeds to fluid dispensing meter 12 with authenticator 16, which includes the dispense-identification data. When the user grasps fluid dispensing meter 12, or otherwise brings authenticator 16 within an operable range of antenna 20, authenticator 16 provides the user-identification data to processor 40 via the communication link between authenticator 16 and antenna 20. In some examples, authenticator 16 is required to be within a short distance of antenna 20 to transmit the user-identification data, such as about 2.54-5.08 cm (about 1.00-2.00 in.). It is understood that the data transmission between authenticator 16 and fluid dispensing meter 12 can be active or passive. Processor 40 recalls the work order information from memory 38 and compares the work order information to the user-identification data to determine if the dispense event is authorized and if the user is authorized to complete a dispense event. For example, memory 38 can contain a list of authorized users that processor 40 compares with the user-identification data. The list of authorized users can include all users authorized to make dispenses or can include particular users associated with particular work orders. In examples where the dispense-identification data includes work order-identification data, processor 40 also receives the work order-identification data from authenticator 16. Processor 40 can then automatically associate the user with the work order.

In some examples, multiple work orders are associated with one user. Processor 40 recalls the work order data from memory 38 and causes user interface 26 to display a list of work orders to the user. In examples where the work order data includes a list of authorized users, the list displayed to the user via user interface 26 contains only those work orders for which the user is authorized to complete the dispense. The user can then select the work order associated with the current dispense event via user interface 26.

When processor 40 determines that the dispense event is not authorized based on the comparison, such as where the user-identification data does not match any user on the list of authorized users, then trigger control mechanism 24 remains deactivated such that the user cannot dispense fluid with fluid dispensing meter 12. Processor 40 can cause user interface 26 to display a notification to the user that the dispense event is not authorized, and can cause fluid dispensing meter 12 to communicate that an unauthorized dispense was attempted to system controller 14.

When processor 40 determines that the dispense event is authorized based on the comparison, then processor 40 enables fluid dispensing meter 12 to proceed with the dispense event. Processor 40 activates trigger control mechanism 24, such as by activating a power source for solenoid 42 to thereby power solenoid 42. With trigger control mechanism 24 activated, trigger 32 is able to shift valve 34 to the open position. The user is then able to dispense the fluid using fluid dispensing meter 12. Fluid dispensing meter 12 can transmit information regarding the dispense event to system controller 14 for work order management and system-wide fluid tracking.

Fluid management system 10 provides significant advantages. Authenticator 16 uniquely identifies a user, and processor 40 is configured to authorize fluid dispenses only when authenticator 16 is within range of antenna 20 and when processor 40 determines that the user-identification data matches the list of authorized users. As such, processor 40 and authenticator 16 prevent unauthorized fluid dispenses, as fluid dispensing meter 12 remains deactivated until processor 40 activates trigger control mechanism 24. Unlocking fluid dispensing meter 12 with authenticator 16 also eliminates the need for the user to remember and enter a PIN code to unlock fluid dispensing meter 12. Instead, the user can simply pick up fluid dispensing meter 12 and processor 40 unlocks fluid dispensing meter 12 based on the proximity of authenticator 16.

Figure 2A:
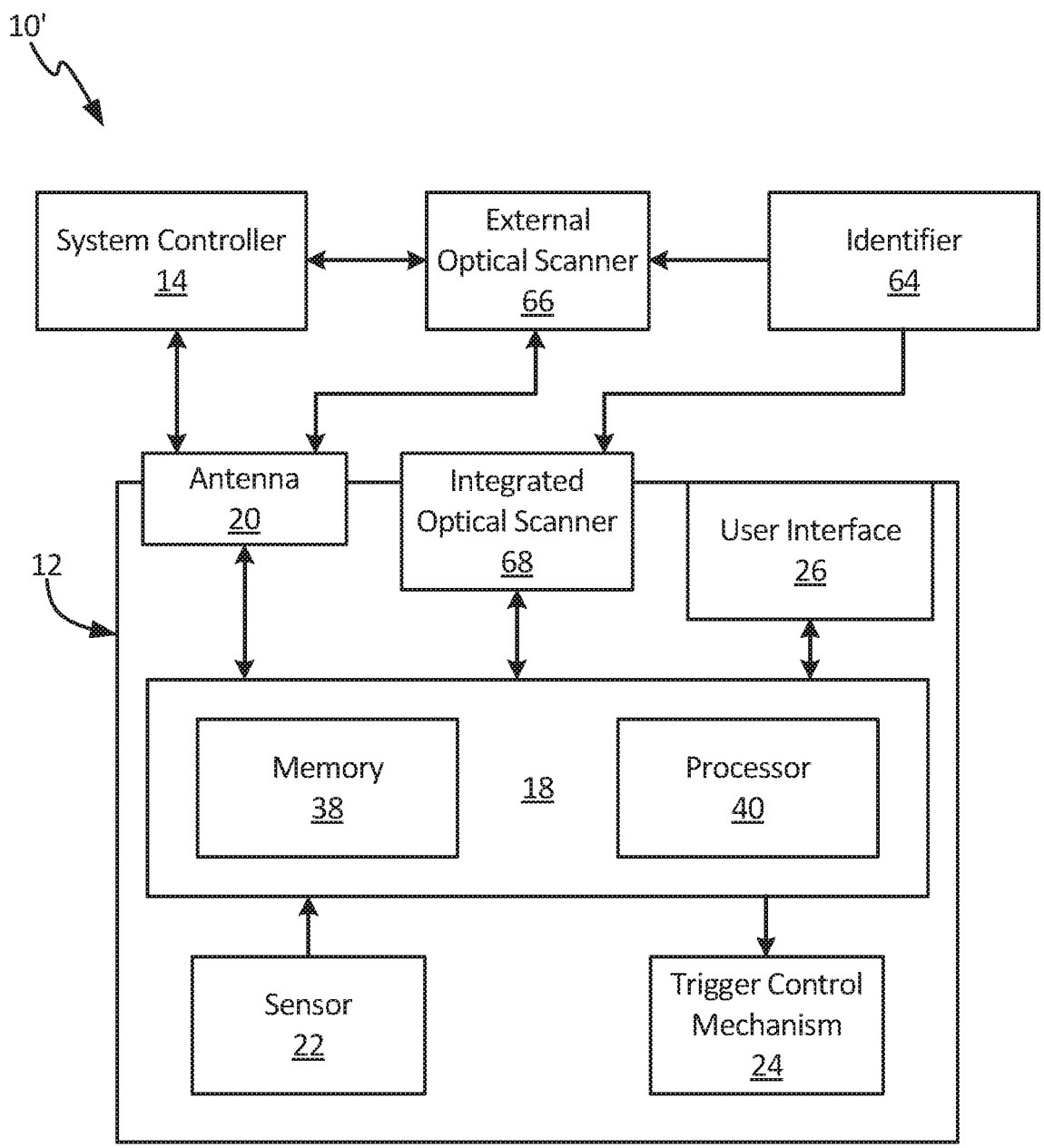
FIG. 2A is a schematic block diagram of a fluid management system.
Figure 2B:
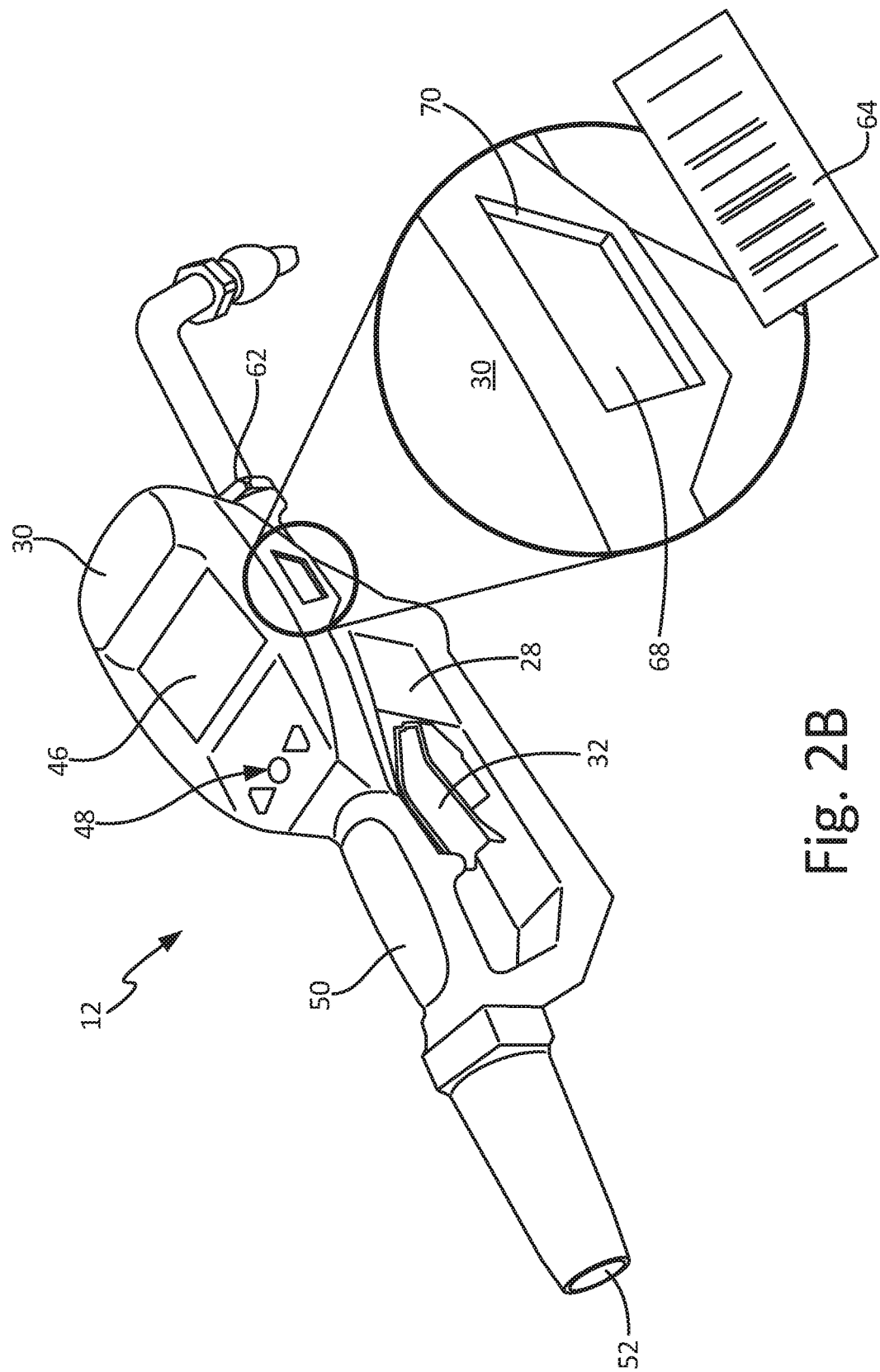
FIG. 2B is a perspective view of a fluid dispensing meter.
Figure 2C:
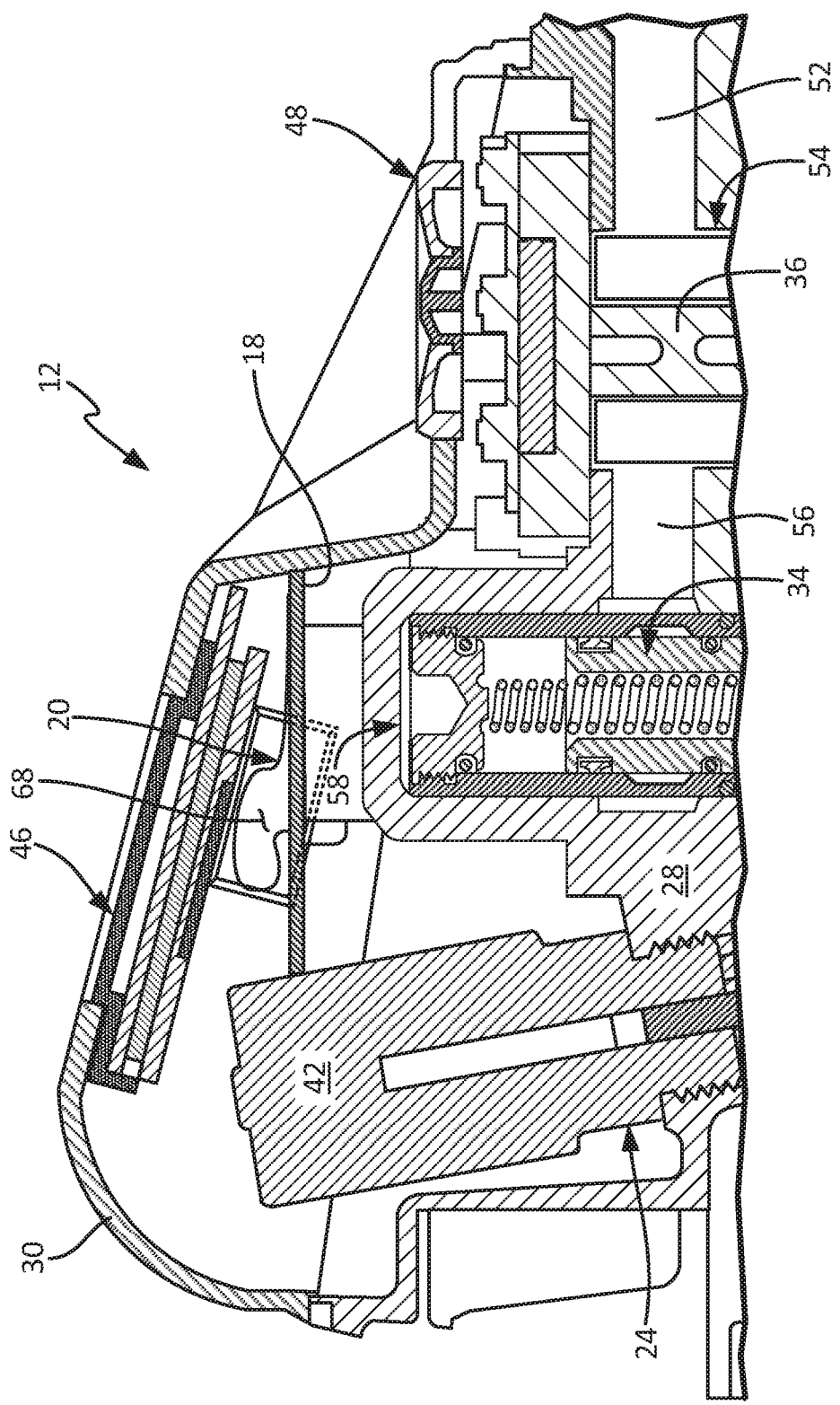
FIG. 2C is a cross-sectional view of a portion of a dispensing meter.

FIG. 2A is a schematic block diagram of fluid management system 10'. FIG. 2B is an isometric view of fluid dispensing meter 12 with an enlarged view of integrated optical scanner 68 and scanner opening 70. FIG. 2C is a cross-sectional view of a portion of fluid dispensing meter 12. FIGS. 2A-2C will be discussed together. Fluid management system 10' includes fluid dispensing meter 12, system controller 14, visual pattern 64, and external optical scanner 66. Fluid dispensing meter 12 includes control board 18, antenna 20, sensor 22, trigger control mechanism 24, user interface 26, meter body 28, bezel housing 30, trigger 32, valve 34, meter 36, and integrated optical scanner 68. Control board 18 includes memory 38 and processor 40. Solenoid 42 of trigger control mechanism 24 is shown. User interface 26 includes display screen 46 and user input 48. Handle 50, fluid inlet 52, metering chamber 54, valve inlet port 56, valve cavity 58, and fluid outlet 62 of meter body 28 are shown. Bezel housing 30 includes scanner opening 70.

Fluid dispensing meter 12 is configured to meter and dispense fluid at various locations within fluid management system 10'. Fluid management software is implemented on system controller 14, and system controller 14 is configured to generate work orders, track and record discrete fluid dispense events, and implement system-wide fluid tracking. It is understood that system controller 14 can be any suitable processor-based device for generating work orders and managing fluid data within fluid management system. For example, system controller 14 can be a PC or a mobile device, such as a smart phone, personal data assistant, handheld bill payment machine, and/or a mobile point of sale system.

Visual pattern 64, which can also be referred to as an external data source, includes a unique identifier that is associated with a work order and/or a user authorized to make a fluid dispense. As such, the unique identifier provides dispense-identification data. For example, the unique identifier data can include user-identification data where visual pattern 64 is associated with a unique user, work order-identification data where visual pattern 64 is associated with a work order, or both where visual pattern 64 is associated with both a user and a work order. Visual pattern 64 can be any visual pattern configured to uniquely identify the user, the work order, or both. For example, visual pattern 64 can be a bar code or a QR code. Each authorized user of fluid management system 10' can be issued a unique visual pattern 64 and/or a unique visual pattern 64 can be generated for each work order. Visual pattern 64 can be disposed on a paper print out and/or can be displayed on the screen of a device.

Figure 3:
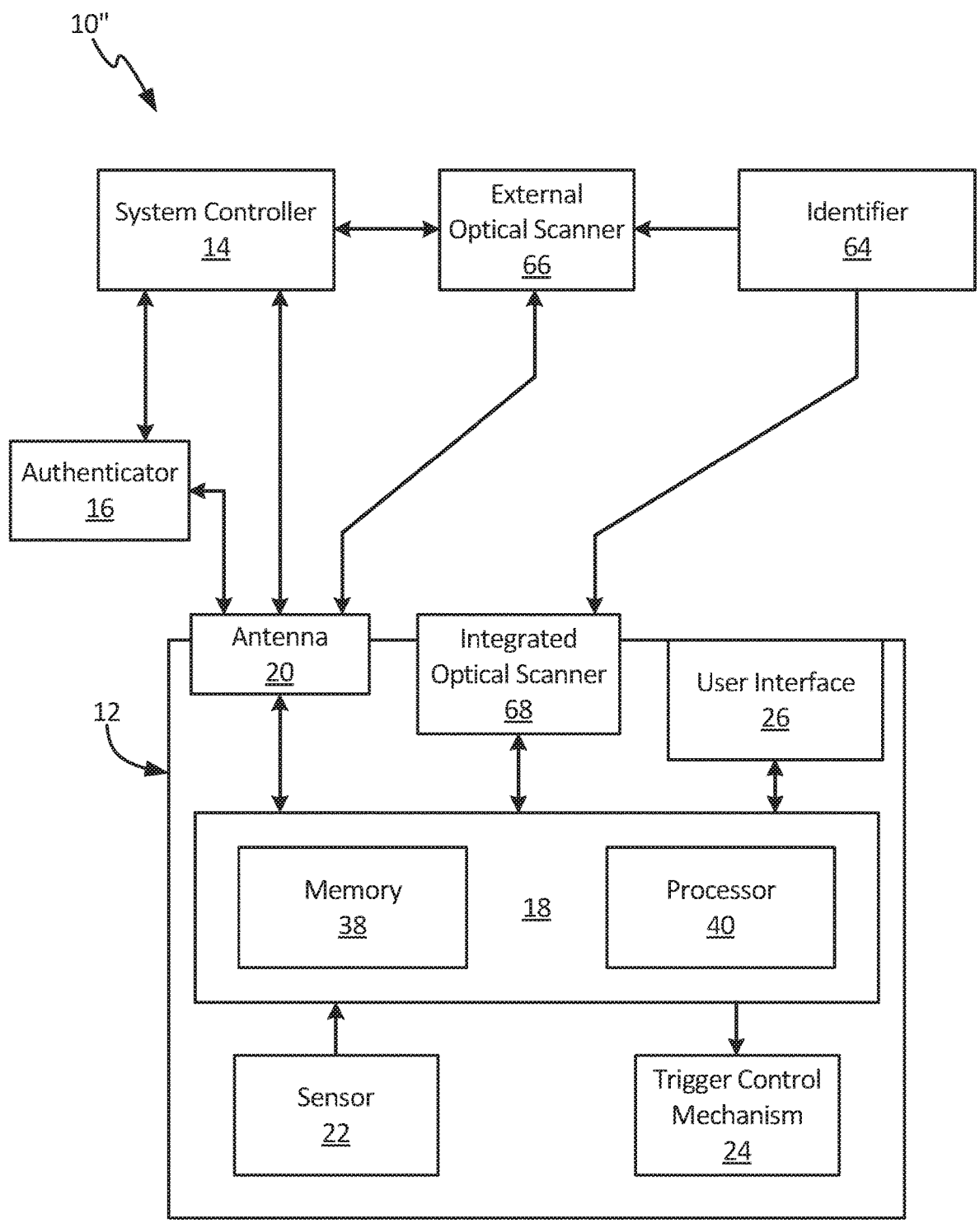
FIG. 3 is a schematic block diagram of a fluid management system.

External optical scanner 66 is configured to perform optical pattern recognition and produce coded signals corresponding to the patterns recognized. For example, external optical scanner 66 can be a bar code scanner. External optical scanner 66 is a separate component from fluid dispensing meter 12. While external optical scanner 66 is illustrated as separate from system controller 14, it is understood that external optical scanner 66 can be integrated into system controller 14, such as where system controller 14 is a smartphone or tablet device. External optical scanner 66 can also communicate visual pattern 64 to fluid dispensing meter 12, either directly or through by way of system controller 14. In some examples, external optical scanner 66 can be equipped with NFC card emulation, similar to authenticator 16 (FIGS. 1A and 3).

Similar to external optical scanner 66, integrated optical scanner 68 is configured to perform optical pattern recognition and produce coded signals corresponding to the patterns recognized. Integrated optical scanner 68 integrated into the electronics of fluid dispensing meter 12 and communicates with processor 40. Integrated optical scanner 68 is mounted in bezel housing 30 and receives visual pattern 64 through scanner opening 70 in bezel housing 30. While scanner opening 70 is illustrated on a side of bezel housing 30, it is understood that scanner opening 70, and integrated optical scanner 68, can be located at any desired location on fluid dispensing meter 12 where integrated optical scanner 68 maintains communications with control board 18. For example, scanner opening 70 can extend through a left-hand side of bezel housing 30, a right-hand side of bezel housing 30, a front of bezel housing 30, or through a hand guard extending around trigger 32. A user can activate integrated optical scanner 68 via user interface 26. Integrated optical scanner 68 can also be referred to as a data receiver.

During operation, fluid dispensing meter 12 utilizes the unique identifier from visual pattern 64 to authorize a fluid dispense event. The user can scan visual pattern 64 with either external optical scanner 66 or integrated optical scanner 68 and the dispense-identification data is transmitted to processor 40. When the user utilizes external optical scanner 66, external optical scanner 66 transmits the dispense-identification data from visual pattern 64 to fluid dispensing meter 12 either directly via the communication link between external optical scanner 66 and fluid dispensing meter 12, or through system controller 14. Where the user utilizes integrated optical scanner 68, the dispense-identification data is provided directly to processor 40 by integrated optical scanner 68. Processor 40 recalls authorized-dispense data from memory 38 and compares the authorized-dispense data to the dispense-identification data to determine if the dispense event is authorized. The authorized-dispense data can include, among others, a list of authorized users and a list of work orders that fluid dispensing meter 12 is authorized to complete.

Processor 40 compares the dispense-identification data from visual pattern 64 to the authorized-dispense data stored in memory 38. For example, where the dispense-identification data from visual pattern 64 include user-identification data, processor 40 compares the user-identification data from visual pattern 64 to a list of authorized users stored in memory 38. If processor 40 determines that the dispense event is authorized, then processor 40 activates trigger control mechanism 24 such that trigger 32 can shift valve 34 to the open position and the user can dispense fluid with fluid dispensing meter 12. With trigger control mechanism 24 activated, the user can dispense the fluid using fluid dispensing meter 12. Processor 40 can end the dispense event by deactivating trigger control mechanism 24, such as where sensor 22 indicates that the actual fluid volume dispensed has reached an authorized fluid volume. Fluid dispensing meter 12 can transmit information regarding the dispense event to system controller 14 for work order management and system-wide fluid tracking.

Fluid management system 10' provides significant advantages. Visual pattern 64 provides unique identification for both work orders and users authorized to make fluid dispenses. Processor 40 is configured to authorized fluid dispenses only when processor 40 determines that the dispense-identification data matches the authorized-dispense data stored in memory 38. Integrated optical scanner 68 allows the dispense-identification data contained in visual pattern 64 to be provided directly to fluid dispensing meter 12 at the dispense location. Providing the dispense-identification data from integrated optical scanner 68 or external optical scanner 66 eliminates the need for the user to remember a PIN code and does not require the user to interact with user interface 26 to unlock fluid dispensing meter 12.

FIG. 3 is a schematic block diagram of fluid management system 10". Fluid management system 10" includes fluid dispensing meter 12, system controller 14, authenticator 16, visual pattern 64, and external optical scanner 66. Fluid dispensing meter 12 includes control board 18, antenna 20, sensor 22, trigger control mechanism 24, user interface 26, and integrated optical scanner 68. Control board 18 includes memory 38 and processor 40.

Fluid dispensing meter 12 can be configured to authorize fluid dispenses based on two-part authentication from visual pattern 64 and authenticator 16. Visual pattern 64 and authenticator 16 are both external data sources. The user scans visual pattern 64 with one of external optical scanner 66 and integrated optical scanner 68. The dispense-identification data received from visual pattern 64 is transmitted to control board 18 and can be stored in memory 38 to be recalled at a later time. For example, multiple work orders can be scanned and the work order-identification data for each unique work order can be stored in memory 38. Each unique work order can be associated with one or more users authorized to complete the work order, such that only that user or group of users are authorized to complete fluid dispense for those work orders. To initiate the dispense event, the user grasps fluid dispending meter 36, bringing authenticator 16 within range of antenna 20. In some examples, the user scans visual pattern 64 with integrated optical scanner 68 at the beginning of the dispense event to activate a work order identified by work order-identification data contained in visual pattern 64.

With the work order activated, processor 40 compares the user-identification data received from authenticator 16 with the list of users authorized to complete that work order. If processor 40 determines that the dispense event is authorized, then processor 40 activates trigger control mechanism 24 such that the user can pull trigger 32 (best seen in FIG. 1B) and shift valve 34 (shown in FIG. 1B) to the open position. If processor 40 determines that the dispense event is unauthorized, then processor 40 does not activate trigger control mechanism 24, and fluid dispensing meter 12 is unable to dispense fluid.

Fluid management system 10" provides significant advantages. Authenticator 16 uniquely identifies a dispense event and/or a user, and processor 40 is configured to authorize fluid dispenses only when authenticator 16 is within range of antenna 20 and when processor 40 determines that the user-identification data matches a list of authorized users stored in memory 38. Visual pattern 64 provides unique dispense-identification data to fluid dispensing meter 12. Processor 40 can recall a list of work orders from memory 38 and identify if the user is authorized to make the fluid dispense based on the user-identification data provide by authenticator 16 and the list of work orders associated with that user-identification data. Passively identifying users with authenticator 16 and automatically activating fluid dispensing meter 12 based on user-identification data allows the user to more quickly and efficiently dispense fluid, as the user is not required to remember a PIN code or actively log into fluid dispensing meter 12.

Figure 4:
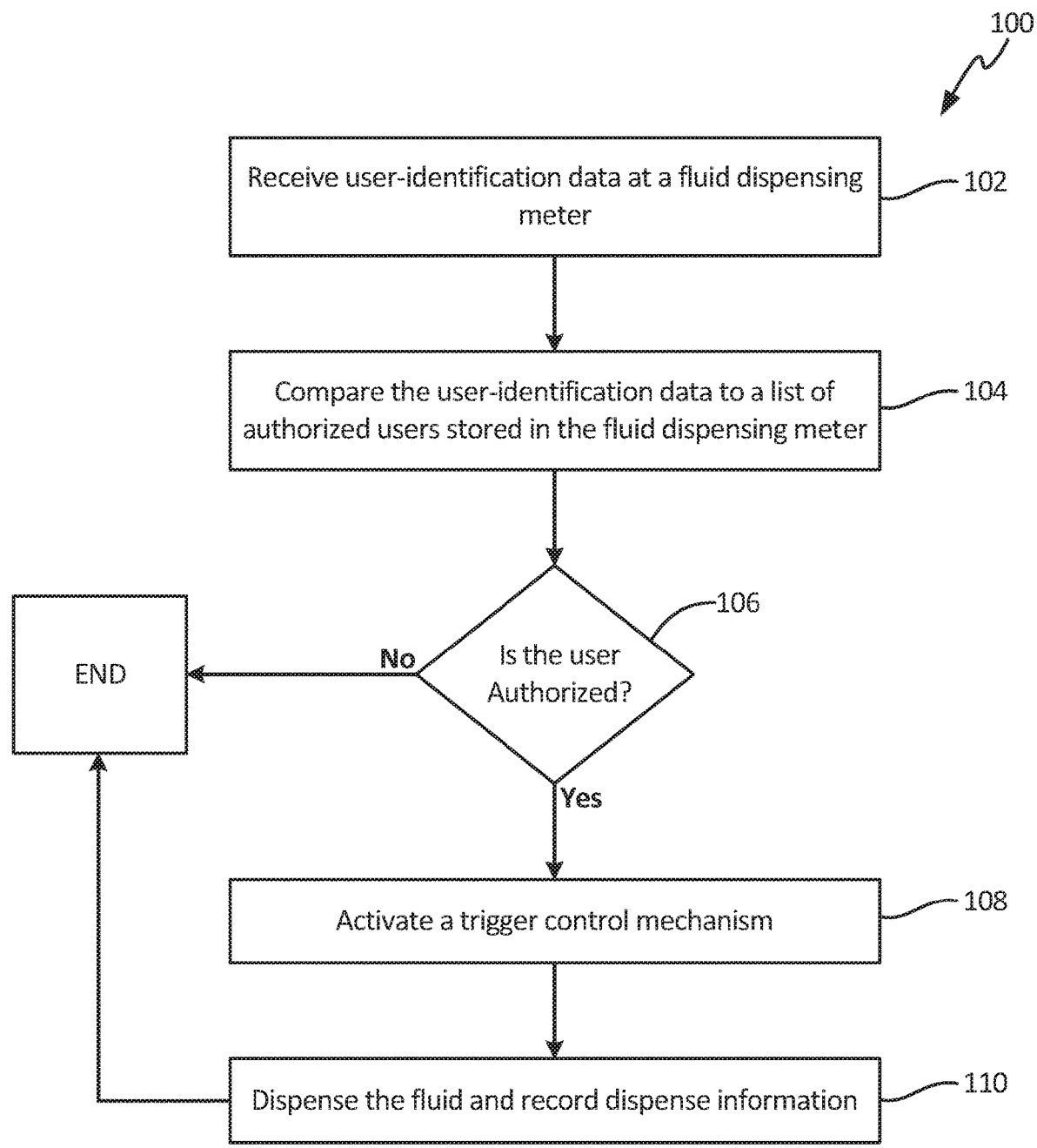
FIG. 4 is a flowchart illustrating a method of dispensing fluid.
Figure 5:
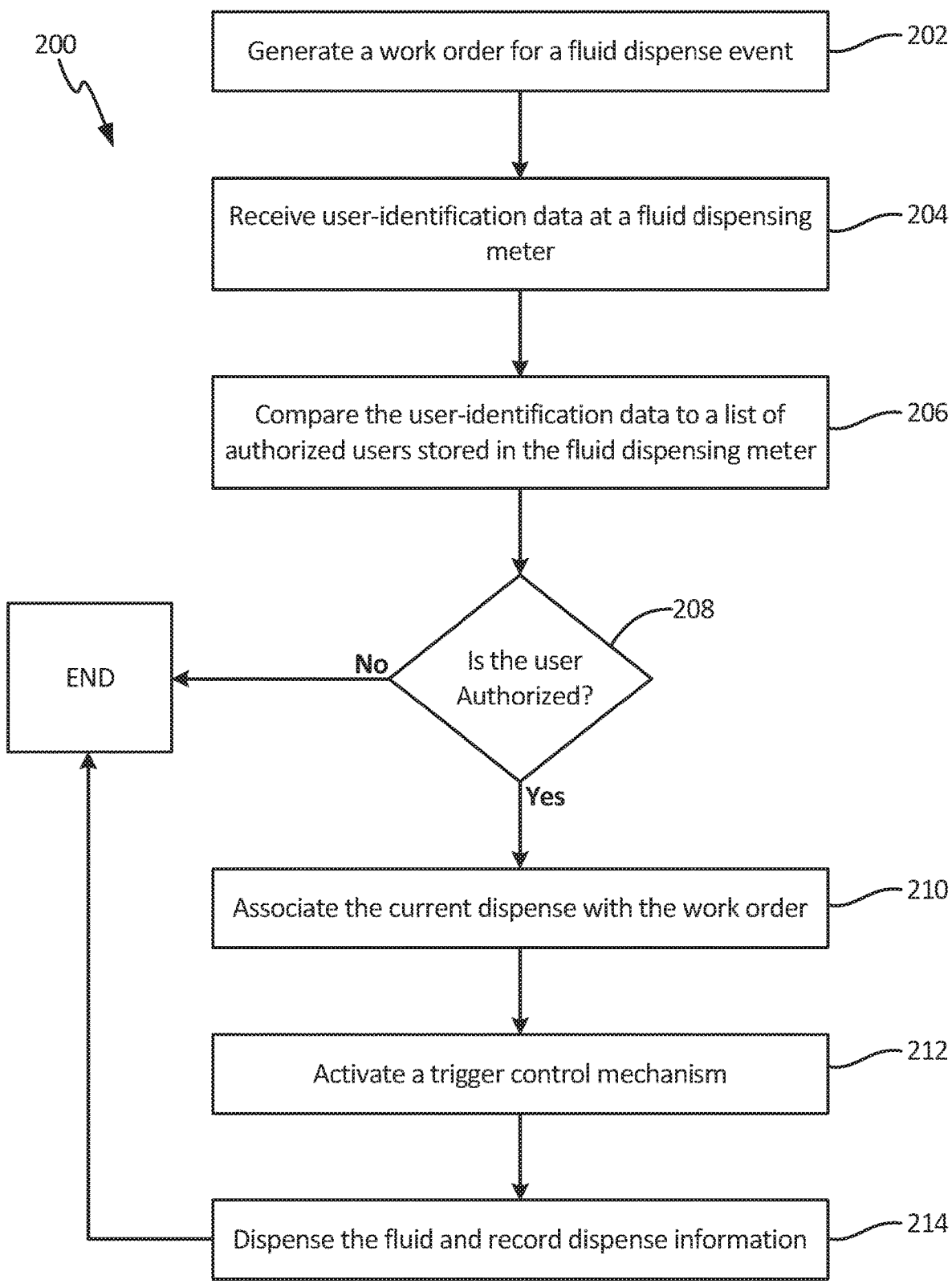
FIG. 5 is a flowchart illustrating a method of dispensing fluid.
Figure 6:
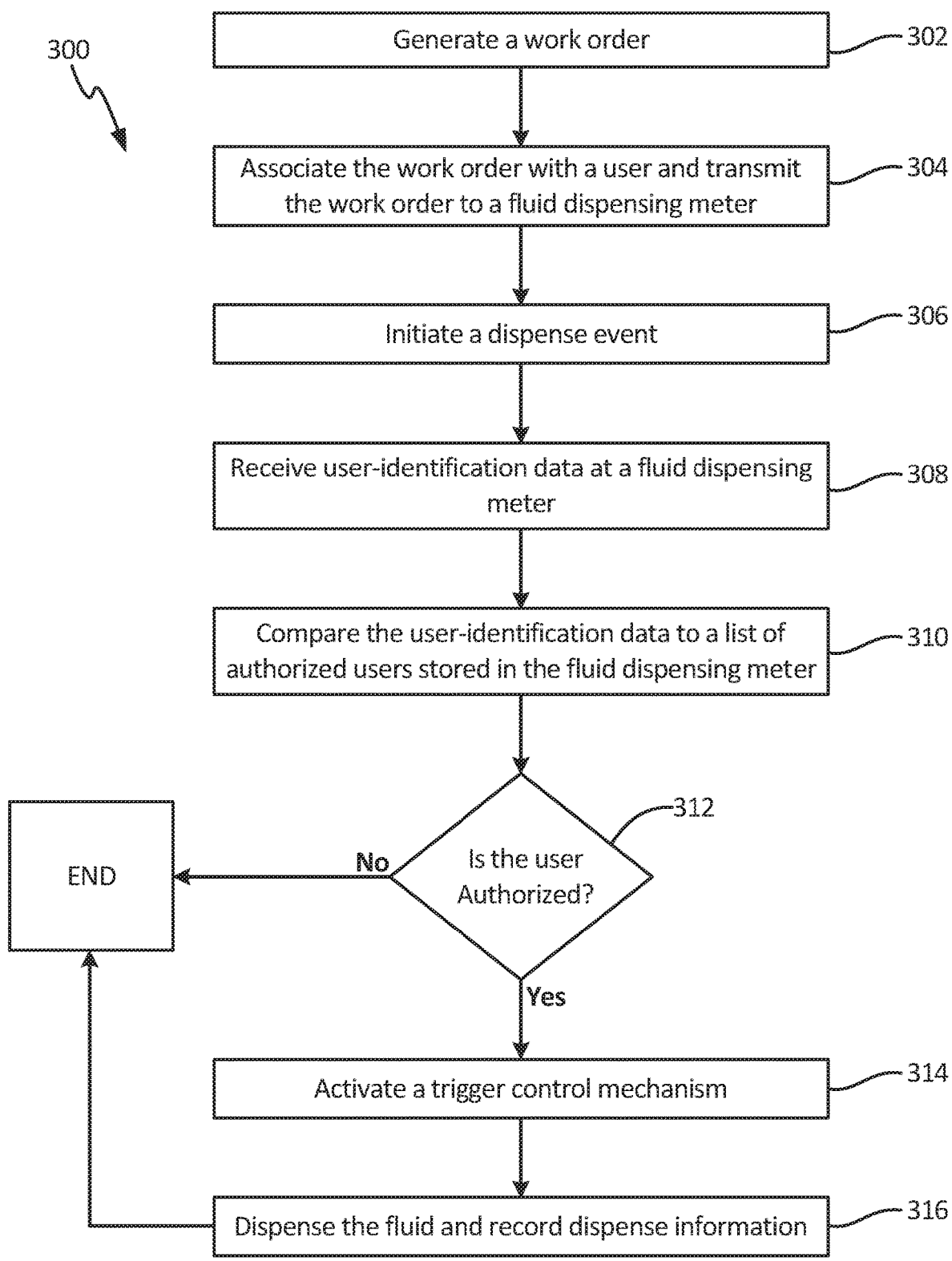
FIG. 6 is a flowchart illustrating a method of dispensing fluid.

FIG. 4, FIG. 5, and FIG. 6 are flowcharts illustrating methods of dispensing fluid. FIGS. 4-6 differ in the level of authorization required for the user. FIG. 4 illustrates method 100 of authorizing a fluid dispense that requires user authorization at fluid dispensing meter 12, such as by authenticator 16 (FIGS. 1 and 3). FIG. 5 illustrates method 200 of authorizing a fluid dispense that requires generation of a work order and user authorization at fluid dispensing meter 12. FIG. 6 illustrates method 300 of authorizing a fluid dispense that requires generation of a work order and association of specific users with that work order. User authorization is still required at fluid dispensing meter 12, but the user is required to be authorized to both dispense fluid using fluid dispensing meter 12 and dispense fluid for that work order.

FIG. 4 is a flowchart illustrating method 100 of authorizing a fluid dispense. In step 102, dispense-identification data, such as user-identification data and/or work order-identification data, is received by a fluid dispensing meter, such as fluid dispensing meter 12 (FIGS. 1A-3). The user-identification data can be passively provided to the fluid dispensing meter by an authentication device utilizing near field communications, such as authenticator 16 (FIGS. 1A and 3). For example, the user can wear a bracelet, watch, ring, belt, or other authentication device that is NFC enabled, and the user-identification data can be transmitted to a processor of the fluid dispensing meter by the authenticator. In another example, the user-identification data is encoded in a visual identifier, such as visual pattern 64 (FIGS. 2A-2B and 3). The user can scan the visual identifier using an optical scanner, such as external optical scanner 66 (FIGS. 2A and 3) or integrated optical scanner 68 (FIGS. 2A-3).

In step 104, the user-identification data provided to the fluid dispensing meter in step 102 is compared to a list of authorized users stored in a memory of the fluid dispensing meter. In step 106, the processor determines if the user is authorized based on the comparison made in step 104. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method 100 proceeds to step 108.

In step 108, the processor of the fluid dispensing meter activates a trigger control mechanism, such as trigger control mechanism 24 (best seen in FIG. 1B). For example, the processor can provide power to a solenoid, such as solenoid 42 (best seen in FIG. 1B), to cause the solenoid to lock a trip rod in position within the fluid dispensing meter. With the trigger control mechanism activated, the trigger of the fluid dispensing meter is able to shift a valve within the fluid dispensing meter into an open position.

In step 110, the user dispenses the fluid with the fluid dispensing meter. In some examples, a preset fluid volume is associated with the user, such that the processor deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 14 (FIGS. 1A, 2A, and 3), for fluid tracking and billing.

FIG. 5 is a flowchart illustrating method 200 of authorizing a fluid dispense. In step 202, a work order is generated for a discrete dispense event. The work order can include dispense information relevant to the dispense event, such as, among others, one or more of the type of fluid to be dispensed, the volume of fluid to be dispensed, the location of the dispense event, and customer information. In step 204, dispense-identification data, such as user-identification data and/or work order-identification data, is received by a fluid dispensing meter, such as fluid dispensing meter 12 (FIGS. 1A-3). The user-identification data can be passively provided to the fluid dispensing meter by an authentication device utilizing near field communications, such as authenticator 16 (FIGS. 1A and 3). For example, the user can wear a bracelet, watch, ring, belt, or other authentication device that is NFC enabled, and the user-identification data can be transmitted to a processor of the fluid dispensing meter by the authenticator. In another example, the dispense-identification data is encoded in a visual identifier, such as visual pattern 64 (FIGS. 2A-2B and 3). The user can scan the visual identifier using an optical scanner, such as external optical scanner 66 (FIGS. 2A and 3) or integrated optical scanner 68 (FIGS. 2A-3).

In step 206, the dispense-identification data provided to the fluid dispensing meter is step 204 is compared to authorized-dispense data stored in a memory of the fluid dispensing meter. In step 208, the processor determines if the user is authorized based on the comparison made in step 206. For example, the processor can compare the user-identification data to a list of authorized users stored in the memory. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method 200 proceeds to step 210.

In step 210, the current dispense event is associated with the work order. In some examples, each authorized user is authorized to complete fluid dispenses for multiple work orders. In one example, the current dispense event is associated with the work order by selecting the work order via a user interface of the fluid dispensing meter. The multiple work orders associated with the user can be displayed on a display screen, such as display screen 46 (best seen in FIG. 1C), of the fluid dispensing meter. The user can select the appropriate work order for the current dispense event by navigating the display screen with the input, such as user input 48 (best seen in FIG. 1C), and selecting the work order. In another example, the user work order data is encoded in a visual identifier, such as visual pattern 64, and the user scans the visual identifier into the fluid dispensing meter using an optical scanner, such as external optical scanner 66 or integrated optical scanner 68.

In step 212, the processor of the fluid dispensing meter activates a trigger control mechanism, such as trigger control mechanism 24 (best seen in FIG. 1B). For example, the processor can provide power to a solenoid, such as solenoid 42 (best seen in FIG. 1B), to cause the solenoid to lock a trip rod in position within the fluid dispensing meter. With the trigger control mechanism activated, the trigger of the fluid dispensing meter is able to shift a valve within the fluid dispensing meter into an open position.

In step 214, the user dispenses the fluid with the fluid dispensing meter. Where a preset fluid volume is associated with the work order and/or the user, the processor deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 14 (FIGS. 1A, 2A, and 3), for fluid tracking and billing.

FIG. 6 is a flowchart illustrating method 300 of authorizing fluid dispenses. In step 302, a work order, and associated work order-identification data, is generated for a discrete dispense event. The work order-identification data can include dispense information relevant to the dispense event, such as, among others, the type of fluid to be dispensed, the volume of fluid to be dispensed, the location of the dispense, and customer information. In step 304, the work order is associated with specific authorized users, such that the fluid dispensing meter will activate only for the specific users associated with the work order. The work order-identification data and associated authorized users are transmitted to one or more fluid dispensing meters, such as fluid dispensing meter 12 (FIGS. 1A-3). In step 306, a dispense event is initiated by loading the work order to the fluid dispensing meter. For example, the work order number can be keyed into the fluid dispensing meter via a user interface of the fluid dispensing meter, or the work order number can be scanned into the fluid dispensing meter by an optical scanner, such as external optical scanner 66 (FIGS. 2A and 3) or integrated optical scanner 68 (FIGS. 2A-3).

In step 308, user-identification data is received by the fluid dispensing meter. The user-identification data can be passively provided to the fluid dispensing meter by an authentication device utilizing near field communications, such as authenticator 16 (FIGS. 1A and 3). For example, the user can wear a bracelet, watch, ring, belt, or other authentication device that is NFC enabled, and the user-identification data can be transmitted to a processor of the fluid dispensing meter by the authenticator. In another example, the user-identification data is encoded in a visual identifier, such as visual pattern 64 (FIGS. 2A-2B and 3). The user can scan the visual identifier using an optical scanner, such as external optical scanner 66 (FIGS. 2A and 3) or integrated optical scanner 68 (FIGS. 2A-3).

In step 310, the user-identification data provided to the fluid dispensing meter is step 308 is compared to a list of authorized users stored in a memory of the fluid dispensing meter. In step 312, the processor determines if the user is authorized based on the comparison made in step 310. If the user-identification data does not match a user identity stored in the list of authorized users, then the answer is NO and the fluid dispensing meter will not allow the user to dispense fluid with fluid dispensing meter. If the user-identification data matches a user identity stored in the list of authorized users stored in the memory, then the answer is YES and method proceed to step 314.

In step 314, the processor of the fluid dispensing meter activates a trigger control mechanism, such as trigger control mechanism 24 (best seen in FIG. 1B). For example, the processor can provide power to a solenoid, such as solenoid 42 (best seen in FIG. 1B), to cause the solenoid to lock a trip rod in position within the fluid dispensing meter. With the trigger control mechanism activated, the trigger of the fluid dispensing meter is able to shift a valve within the fluid dispensing meter into an open position.

In step 316, the user dispenses the fluid with the fluid dispensing meter. In examples where a preset fluid volume is associated with the work order and/or the user the processor deactivates the trigger control mechanism based on the actual fluid volume dispensed reaching the preset fluid volume. Dispense information, such as the type of fluid dispensed, the identity of the user completing the dispense, the time of the dispense, the volume of fluid dispensed, and the location of the dispense are recorded. In one example, the dispense information is transmitted to a system controller, such as system controller 14 (FIGS. 1A, 2A, and 3), for fluid tracking and billing.

Figure 7A:
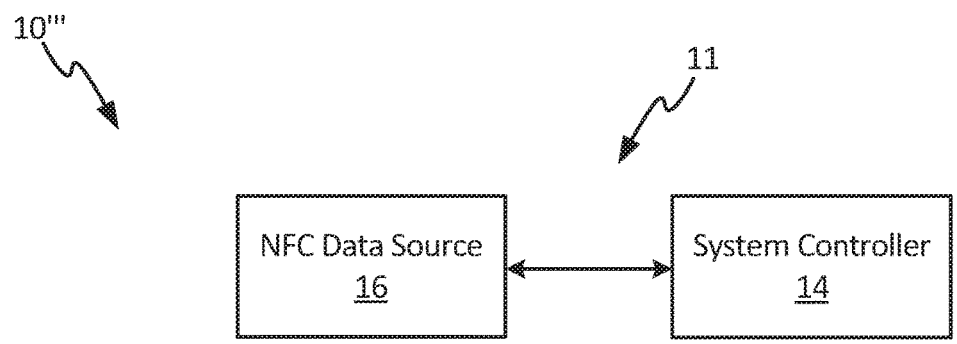
FIG. 7A is a schematic block diagram of a first part of a fluid management system.
Figure 7B:
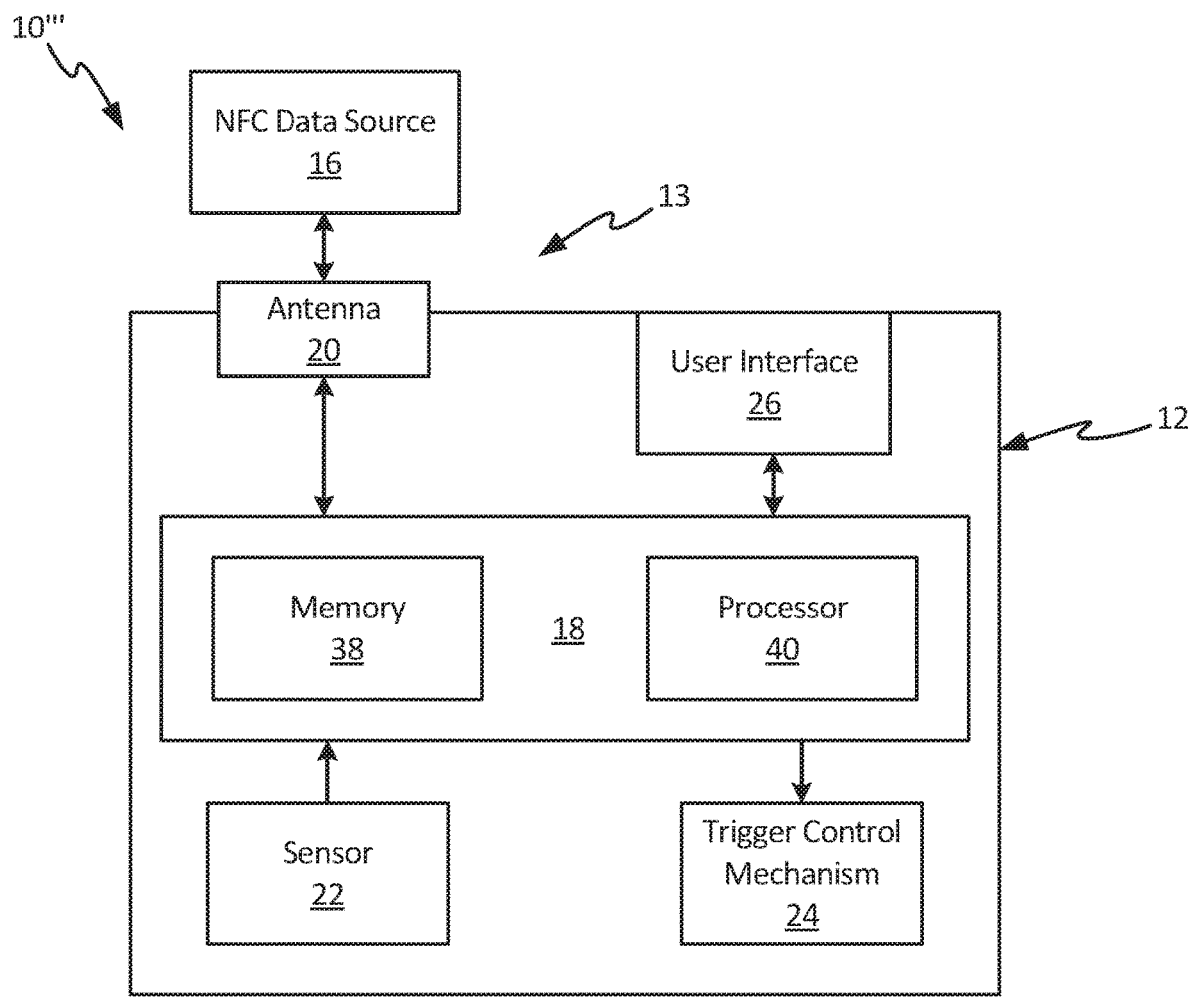
FIG. 7B is a schematic block diagram of a second part of the fluid management system shown in FIG. 7A.

FIG. 7A is a schematic block diagram of first part 11 of fluid management system 10′″. FIG. 7B is a schematic block diagram of second part 13 of fluid management system 10′″. First part 11 of fluid management system 10′″ includes system controller 14 and authenticator 16. Second part 13 of fluid management system 10′″ includes authenticator 16 and fluid dispensing meter 12. Fluid dispensing meter 12 includes control board 18, antenna 20, sensor 22, trigger control mechanism 24, and user interface 26. Control board 18 includes memory 38 and processor 40.

Fluid management system 10′″ is a system for generating, authorizing, and tracking fluid dispense events. For example, fluid management system 10′″ can be implemented in an automotive shop, on a manufacturing line, and/or at any other suitable location to track dispenses of oil, coolant, and other fluids. In first part 11 of fluid management system 10′″, dispense-identification data is generated and written to authenticator 16. In second part 13 of fluid management system 10′″, authenticator 16 communicates dispense-identification data to fluid dispensing meter 12. Fluid dispensing meter 12 includes software stored on memory 38 that, when executed by processor 40, authorizes or denies fluid dispenses by fluid dispensing meter 12 based on the dispense-identification data communicated to fluid dispensing meter 12 by authenticator 16.

Fluid dispensing meter 12 is configured to dispense and meter fluid at various locations within fluid management system 10. Fluid management software is implemented on system controller 14, and system controller 14 is configured to generate work orders, track and record discrete fluid dispense events, and/or implement system-wide fluid tracking. It is understood that system controller 14 can be any suitable processor-based device for generating dispense information and writing the dispense information to authenticator 16. For example, system controller 14 can be a PC or a mobile device, such as a smart phone, personal data assistant, handheld bill payment machine, and/or a mobile point of sale system.

Authenticator 16 is a device configured to receive, store, and transmit data regarding fluid dispenses utilizing NFC. Authenticator 16 can also be referred to as an external data source and/or as an NFC data source. As such, authenticator 16 can automatically, wirelessly transmit and/or receive data when brought within a short distance, such as about 2.54-5.08 cm (about 1.00-2.00 in.), of a compatible device. Authenticator 16 can therefore be referred to as an NFC data source. Authenticator 16 is configured for NFC communications according to any desired standard, such as ISO/IEC 18092/ECMA-340; ISO/IEC 21481/ECMA-342; GSMA; NFC Forum; and/or any other applicable standard regarding NFC communications. Authenticator 16 can take any desired form that can receive an NFC tag to be capable of NFC communications. For example, authenticator 16 can be an NFC-configured wristband, an NFC-configured card, an NFC-configured sticker, an NFC-configured ring, an NFC-configured token, or any other desired NFC-capable device.

In first part 11 of fluid management system 10''', relevant dispense-authorization data is generated and stored on authenticator 16. The dispense-authorization data can be stored on authenticator 16 in a read-only format or a read-write format. The dispense-authorization data is provided to system controller 14, and system controller 14 writes the dispense-authorization data to authenticator 16. For example, a user can provide the dispense-authorization data to system controller 14 via a user interface of system controller 14, and the user can then cause system controller 14 to write the data to authenticator 16. While system controller 14 is described as generating and writing data to authenticator 16, it is understood that any device capable of writing information to an NFC device can be utilized to provide the dispense-identification data to authenticator 16. In addition, a programming unit separate from system controller 14 can be utilized to write the dispense-authorization data to authenticator 16. For example, a facility can include a plurality of programming units at locations remote from system controller 14 to facilitate loading information to authenticator 16. In some examples, the programming units are networked together and/or with system controller 14 to facilitate fluid management and tracking throughout fluid management system 10'''.

The dispense-authorization data includes sufficient information to facilitate a fluid dispense event. For example, the dispense-authorization data can include fluid type information and dispense volume information. The fluid type information provides information regarding the type of fluid for the dispense event, and the dispense volume information provides the volume of fluid for the fluid dispense event. The fluid type information can be generic, such as "motor oil," or can be specific, such as "10 W-30 synthetic motor oil." The dispense-authorization data can also include any additional information desired to be communicated to fluid dispensing meter 12 regarding the dispense event. For example, the dispense-authorization data can include user-identification data and work order-identification data.

In other examples, the data generated and stored in first part 11 can be initial configuration data regarding fluid dispensing meter 12. Initial configuration data is the information provided to fluid dispensing meter 12 and stored in memory 38 during an initial set up of fluid dispensing meter 12 prior to operation. The initial configuration data is stored in memory 38 and is recalled during use of fluid dispensing meter 12. The configuration data can include one or more of the type of fluid connected to fluid dispensing meter 12, authorized-dispense data for fluid dispensing meter 12, the display language of user interface 26 (e.g. English, Spanish, German, etc.), the units for dispense quantities (e.g. gallons, liters, etc.), and/or any other desired information for configuring fluid dispensing meter 12 for use.

In second part 13 of fluid management system 10''', the dispense-authorization data generated and stored in first part 11 is communicated to fluid dispensing meter 12 by authenticator 16. The dispense-authorization data is utilized by fluid dispensing meter 12 to determine if a dispense event is authorized and/or to configure fluid dispensing meter 12 for use. Second part 13 of fluid management system 10''' is separate from first part 11 in that authenticator 16 authorizes fluid dispenses in second part 13 without requiring any additional communication between system controller 14 and either authenticator 16 or fluid dispensing meter 12.

Antenna 20 is disposed in and/or on fluid dispensing meter 12 and is in communication with processor 40. Antenna 20, which is a data receiver and can, in some examples, also be a data transmitter, is configured to communicate with authenticator 16. As such, where authenticator 16 is an NFC-configured device, antenna 20 can be an NFC tag capable of communicating with authenticator 16. It is understood, that fluid dispensing meter 12 can be configured to communicate utilizing multiple modes of wireless communications, such as Bluetooth SIG (e.g., Bluetooth 5, Bluetooth low energy protocol stack, Bluetooth Ultra Low Power, etc.), Wibree, BlueZ, Affix, ISO 13157, IEEE 802/Wi Fi, ISO/IEC 15693, ISO/IEC 14443, ISM band, WLAN, active RFID (e.g., Active Reader Active Tag), passive RFID (e.g., Active Reader Passive Tag), NFCIP-1, ISO/IEC 18092, among other options. As such, fluid dispensing meter 12 can include one or more additional data receivers and/or data transmitters to facilitate communications utilizing the multiple modes.

Antenna 20 transmits information to and from control board 18 during operation. It is understood that antenna 20 can include transceiver electronics as known in the art. As such, antenna 20 can also be referred to as a transceiver that can transmit and/or receive data and that includes a physical component for transducing wireless signals and circuitry for handling/communicating the signals from the physical component, as known in the art. Memory 38 of fluid dispensing meter 12 includes software that, when executed by processor 40, authorizes fluid dispenses; tracks and, in some examples, records the volume of fluid dispensed; and communicates fluid dispense information to the user and/or authenticator 16. Processor 40, which can be implemented in some embodiments as a plurality of discrete circuitry subassemblies, can control trigger control mechanism 24 between the activated state and the deactivated state based on the data received from authenticator 16. As described above with regard to FIGS. 1-3, trigger control mechanism 24 controls the functionality of trigger 32 (shown in FIGS. 1B and 2B) such that the user can dispense fluid when trigger control mechanism 24 is in the activated state and the user cannot dispense fluid when trigger control mechanism 24 is in the deactivated state. Sensor 22 is disposed in fluid dispensing meter 12 and is configured to sense the volume of fluid flowing through fluid dispensing meter 12 during a dispense event and to generate a volumetric flow count. Sensor 22 communicates the volumetric flow count to control board 18.

During operation, authenticator 16 provides all information required to authorize a fluid dispense from fluid dispensing meter 12. In first part 11, the dispense-authorization data is generated at system controller 14 and written to authenticator 16. Authenticator 16 facilitates information transfer between system controller 14 and fluid dispensing meter 12. Authenticator 16 authorizes fluid dispenses by fluid dispensing meter 12 without requiring communication between fluid dispensing meter 12 and system controller 14 or any other central database. Instead, authenticator 16 is a physical object that provides information transfer between system controller 14 and fluid dispensing meter 12

The user brings authenticator 16 within operable range of antenna 20. As described above, in some embodiments, authenticator 16 is an NFC-configured device and antenna 20 is an NFC tag. As such, the operable range is less than about 20 cm (about 8 inches) and preferably about 2.54-5.08 cm (about 1.00-2.00 in.). Antenna 20 is powered by the power source of fluid dispensing meter 12, and antenna 20 wirelessly receives the dispense-authorization data from authenticator 16. As noted above, the dispense-authorization data includes sufficient information to facilitate the dispense event, such as the fluid type information and dispense volume information.

The dispense-authorization data is provided to fluid dispensing meter 12 by authenticator 16. Processor 40 can recall configuration data from memory 38 and compare the configuration data to the dispense-authorization data. Processor 40 can determine whether to authorize or deny the fluid dispense based on that comparison. For example, the configuration data can include the type of fluid that fluid dispensing meter 12 is connected to dispense. Processor 40 then compares that configuration data to the fluid type information from the dispense-authorization data to determine the authorization status of the dispense event. If the fluid type information from the dispense-authorization data matches the fluid type information from the configuration data, then processor 40 knows that fluid dispensing meter 12 can make the requested dispense. Processor 40 then causes trigger control mechanism 24 to enter the activated state, which allows the user to dispense fluid with fluid dispensing meter 12.

As the fluid is dispensed, sensor 22 generates and communicates the volumetric flow count to processor 40. Processor 40 compares the volumetric flow count to the dispense volume information from the dispense-authorization data. Processor 40 knows that fluid dispensing meter 12 has dispensed the full volume of fluid authorized for that dispense event when the volumetric flow count reaches the authorized dispense volume. Processor 40 then causes trigger control mechanism 24 to enter the deactivated state, which stops the flow of fluid through fluid dispensing meter 12 and prevents the user from dispensing additional fluid. The fluid dispense event is thus complete.

Authenticator 16 can also, in some examples, include dispense-authorization data for multiple fluid dispense events. For example, authenticator 16 can include information for a first dispense event and a second dispense event. The dispense-authorization data for the first and second dispense events can include the same fluid type information with different dispense volume information. In such an instance, processor 40 will prompt the user, via user interface 26, to select the dispense event that the user wants to complete. In examples where the first and second dispense events have different fluid types, processor 40 can automatically select and authorize one of the dispense events based on the fluid type information from the configuration data.

Authenticator 16 can be configured as either read-only or read-write. When authenticator 16 is read-only, the dispense-authorization data remains on authenticator 16, such that authenticator 16 can authorize multiple dispenses of the same fluid type and quantity. When authenticator 16 is read-write, dispense-authorization data can be removed from authenticator 16 based on fluid dispensing meter 12 accepting and authorizing the fluid dispense event. Removing the dispense-authorization data from authenticator 16 prevents additional, undesired fluid dispenses and can be used to confirm dispenses. For example, the user can bring authenticator 16 back to system controller 14, and system controller 14 can read authenticator 16 to confirm the number of dispense-authorizations remaining on authenticator 16. With authenticator 16 being read-write, fluid dispensing meter 12 can also write dispense information regarding each dispense event to authenticator 16. The dispense information is then stored on authenticator 16 until authenticator 16 is brought within operable range of system controller 14, at which point authenticator 16 communicates the dispense information to system controller 14 to facilitate system-wide fluid management and tracking. In other examples, fluid dispensing meter 12 can provide the dispense information directly to system controller 14, such as via Wi-Fi, Bluetooth, or other modes of wireless communication.

Fluid management system 10''' and authenticator 16 facilitate efficient, secure fluid dispenses across a variety of applications.

In one example, authenticator 16 is configured as a fluid voucher. Authenticator 16 is loaded with dispense-authorization data for multiple dispense events at system controller 14. When authenticator 16 is brought within operable range of fluid dispensing meter 12, fluid dispensing meter 12 authorizes a dispense event based on the dispense-authorization data contained on authenticator 16. The authorized dispense event is removed from authenticator 16 based on fluid dispensing meter 12 accepting and authorizing the dispense event. As such, authenticator 16 would then include dispense-authorization data for one less dispense event.

For example, authenticator 16 can be loaded with dispense-authorization data relating to five individual dispense events. The dispense-authorization data can be the same for each dispense event (i.e. all dispenses include the same fluid type information and dispense volume information) or can vary across the various dispense events. Authenticator 16 is brought within operable range of fluid dispensing meter 12, and processor 40 determines the authorization status based on the dispense-authorization data received from authenticator 16. If processor 40 determines that the event is authorized, then processor 40 will cause trigger control mechanism 24 to enter the activated state and will remove the dispense-authorization data from authenticator 16. With that dispense-authorization data removed from authenticator 16, authenticator 16 now includes dispense-authorization data for four additional dispense events.

Configuring authenticator 16 as a fluid voucher can provide significant advantages. A user, such as an automotive shop, can provide pre-loaded NFC data sources (i.e., authenticator 16) to customers that can be redeemed when bringing a vehicle in for servicing. Storing fluid vouchers on and redeeming fluid vouchers through authenticator 16 provides a secure system that avoids coupon issues, such as counterfeiting and alterations. The user simply brings authenticator 16 within operable range of fluid dispensing meter 12 to authorize the dispense event. Fluid dispensing meter 12 actually authorizing the dispense event validates the fluid voucher, providing increased confidence to both the user and the consumer.

In other examples, authenticator 16 is configured as a general authorization device for use of fluid dispensing meter 12. For example, authenticator 16 can include dispense-authorization data that authorizes dispenses of a certain fluid type, such as transmission fluid. In some examples, the dispense-authorization data can further or alternatively include an authorized timeframe within which authenticator 16 is able to activate fluid dispensing meter 12. For authenticator 16 to activate fluid dispensing meter 12, processor 40 compares the fluid type associated with fluid dispensing meter 12 to the fluid type information from the dispense-authorization data. Processor 40 also or alternatively compares the authorized timeframe to the current time to determine if the dispense event is authorized. For example, the authorized timeframe can be the business hours of an automotive shop. Processor 40 will deny any attempted fluid dispense occurring outside of the business hours based on current time being outside of the authorized timeframe provided by authenticator 16. In such an example, the authorized timeframe and/or dispense-authorization data can be read-only, such that the dispense-authorization data is not removed from authenticator 16 upon authorization of a dispense event by fluid dispensing meter 12. Authenticator 16 being a general authorization device can provide significant advantages. As a general authorization device, authenticator 16 prevents unauthorized dispenses outside of a desired timeframe and provides greater end user confidence by ensuring that the correct, desired fluid is dispensed.

In other examples, authenticator 16 is configured as a rechargeable key. Authenticator 16 being a rechargeable key means that authenticator 16 provides authorization for a defined period before authenticator 16 needs to be reloaded to authorize additional fluid dispenses. The defined period can be based on a time period and/or a number of dispenses. For example, the authorized-dispense data can include a defined time period that begins to run when authenticator 16 first provides authorized-dispense data to fluid dispensing meter 12 or begins to run as soon as authorized-dispense data is loaded onto authenticator 16. Alternatively or in addition to the defined time period, a set number of dispenses can be written onto authenticator 16. Similar to the voucher capabilities discussed above, dispense-authorization data for a single dispense event can be subtracted from the plurality of dispense events each time a fluid dispense event is authorized by authenticator 16. Authenticator 16 would need to be reloaded with additional dispense-authorization data after the set number of dispenses is exhausted. Configuring authenticator 16 as a rechargeable key can provide significant advantages. Authenticator 16 prevents unauthorized dispense from occurring beyond the number authorized and/or outside of the authorized timeframe, providing increased security and confidence.

In other examples, fluid management system 10''' is utilized for fleet-based fluid management to track, monitor, and authorize fluid dispenses for a fleet of vehicles. An authenticator 16 can be located on each individual vehicle in a fleet of vehicles and can be loaded with information specific to the individual vehicle. When the vehicle is brought in for servicing, the technician is able to recall relevant information regarding the vehicle by simply bringing fluid dispensing meter 12 within operable range of authenticator 16. Authenticator 16 provides relevant information to the user via user interface 26 of fluid dispensing meter 12. In some examples, authenticator 16 can also provide immediate authorization for dispenses of various fluids based on the elapsed time since the vehicle was last serviced. Updated service information can be written to authenticator 16 by fluid dispensing meter 12 throughout servicing, such as at the end of each fluid dispense event.

For example, authenticator 16 can be located on a vehicle, such as by locating an NFC-configured sticker on the dashboard or the vehicle door jamb. The dispense-authorization data loaded onto authenticator 16 is based on the particular vehicle that authenticator 16 is associated with. For example, different engines require different types and quantities of fluids. The dispense-authorization data loaded onto authenticator 16 is specific to that vehicle's fluid requirements. Most vehicle fluids are supposed to be replaced after a certain time period or a certain number of miles driven. Authenticator 16 can automatically authorize fluid dispenses based on the certain time period passing since the most-recent servicing.

For example, the vehicle may require an oil change every three months and a power steering fluid change every three years. For example, it can be assumed that both of the fluids were changed at the first vehicle servicing. Dispense-authorization data regarding both the oil and the power steering fluid is written to authenticator 16 after the fluid dispenses are complete. The dispense-authorization data written to authenticator 16 can include a specific time interval for each fluid, the date on which the servicing occurred, and/or the date that the next servicing is required. The vehicle is brought in for its second servicing after five months. Fluid dispensing meter 12 is brought within operable range of authenticator 16, and authenticator 16 provides the dispense-authorization data to fluid dispensing meter 12. Because more than three months have elapsed since the last oil change, authenticator 16 authorizes a fluid dispense event for oil. However, because less than three years have passed since the last power steering fluid change, authenticator 16 does not authorize a fluid dispense event for the power steering fluid. The dispense-authorization data for oil is reset such that authenticator 16 will not authorize another oil dispense until the specific time interval has passed since the second servicing.

Authenticator 16 can automatically reset the time interval based on authenticator 16 providing the authorization for an oil dispense to fluid dispensing meter 12, based on fluid dispensing meter 12 accepting the authorization from authenticator 16, or based on the fluid dispense event being completed. For example, the user can dispense the oil and then bring fluid dispensing meter 12 within operable range of authenticator 16 to provide information to authenticator 16 and reset the specific time interval. Utilizing fluid management system 10''' for fleet-based fluid management can provide significant advantages. The information specific to each vehicle in the fleet is stored on an authenticator 16 specific to that vehicle. The service technician does not need to look up the last service date for each fluid from a central database, but instead simply brings fluid dispensing meter 12 within operable range of authenticator 16. This provides a simpler, more efficient process for ascertaining the status of various fluids.

In another example, fluid management system 10''' can be implemented during the vehicle manufacturing process. When a vehicle is manufactured it requires first fills of various fluids. Authenticator 16 can be loaded with dispense-authorization data for each of the various fluids, and authenticator 16 can be located on the vehicle in any desired manner. As such, authenticator 16 can provide a "recipe" for first fluid fills during manufacturing. As the vehicle reaches a point in the manufacturing process where a first fill is desired, a fluid dispensing meter 12 is brought within operable range of authenticator 16. Fluid dispensing meter 12 receives dispense-authorization data from authenticator 16. As discussed above, fluid dispensing meter 12 is initially configured at set up so fluid dispensing meter 12 knows the fluid type that fluid dispensing meter 12 is connected to. Fluid dispensing meter 12 will accept and initiate only fluid dispenses for the fluid type associated with fluid dispensing meter 12 during the initial configuration. In some instances, similar to the voucher example discussed above, the dispense-authorization data regarding that fluid is removed from authenticator 16 when the dispense event is accepted by fluid dispensing meter 12. Removing the dispense-authorization data regarding the authorized dispense event from authenticator 16 provides tracking and eliminates uncertainty as to whether the fluid has previously been added. At the end of the manufacturing process, authenticator 16 can be checked to ensure that all required fluids have been added to the vehicle. Where authenticator 16 includes no additional dispense-authorization data, the manufacturer knows that all of the initial fluid fills have been completed.

Fluid management system 10''' provides significant advantages. Fluid management system 10''' does not require any wired connections between the point of authorization, such as system controller 14, and fluid dispensing meter 12. Instead, authenticator 16 is physically moved between the point of authorization and fluid dispensing meter 12 to provide dispense-authorization data to fluid dispensing meter 12. In addition, first part 11 and second part 13 of fluid management system 10''' are separate; as such, dispense events can be created and loaded to authenticator 16, and authenticator 16 can be managed as a physical component of fluid management system 10'''. Managing authenticator 16 as a physical component of fluid management system 10''' provides greater certainty to the user and simplifies tracking of fluid dispenses. In addition, fluid management system 10''' utilizes NFC to transfer data to and from authenticator 16, which protects against RF interference that can affect other wireless systems. Authenticator 16 can also take any desired form capable of supporting an NFC tag, such as a card, fob, wearable, sticker, etc. Authenticator 16 can thus be implemented in any desired way to best meet the requirements of the particular application that authenticator 16 is being used in. Authenticator 16 thereby provides flexibility to fluid management system 10''' to allow fluid management system 10''' to adapt to any desired environment, from an automotive shop to a manufacturing line.

Figure 8:
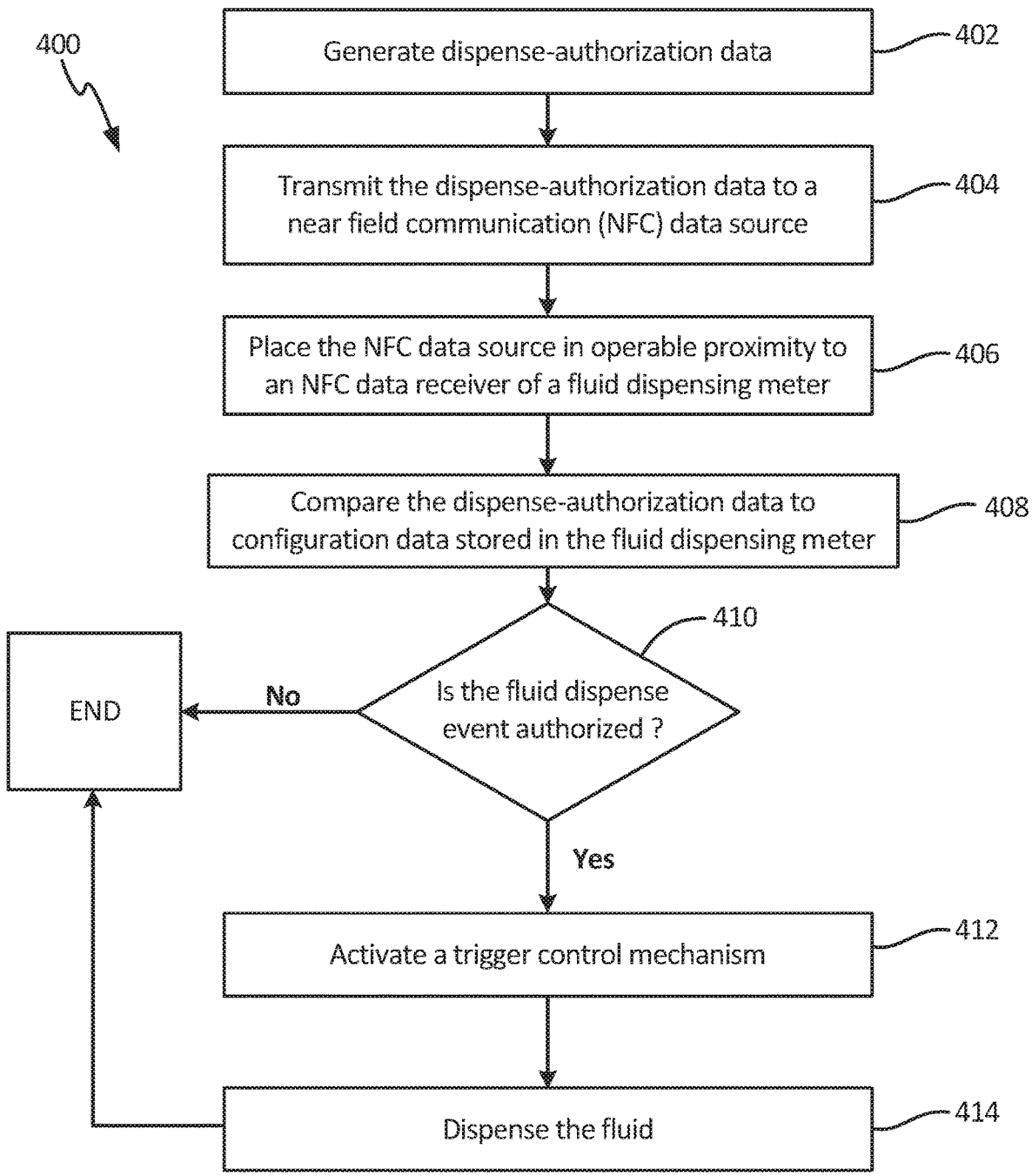
FIG. 8 is a flowchart illustrating a method of dispensing fluid.

FIG. 8 is a flowchart illustrating method 400 of dispensing fluid. Method 400 is performed using a fluid management system, such as fluid management system 10''' (FIGS. 7A and 7B), and a near field communication ("NFC") data source, such as authenticator 16 (FIGS. 7A and 7B), to provide user-identification data, work order data, and/or other data to a fluid dispensing meter, such as fluid dispensing meter 12 (shown in FIGS. 1A-3, 7A, and 7B). The fluid dispensing meter includes a trigger control mechanism, such as trigger control mechanism 24 (best seen in FIG. 1B); an NFC data receiver, such as antenna 20 (FIG. 7B); and a control board, such as control board 18 (shown in FIGS. 1A-2A, 2C, 3, and 7B). However, with this embodiment, the dispensing meter may, optionally, not include a Wi-Fi antenna. Instead (or in addition to the Wi-Fi antenna), the fluid data receiver is configured to receive the dispense-authorization data (e.g., a fluid dispense "voucher") from an NFC-configured data source, which may be in addition to or in lieu of the user-identification data. The control board includes a processor, such as processor 40 (FIGS. 1A, 2A, 3, and 7B), and a memory, such as memory 38 (FIGS. 1A, 2A, 3, and 7B), encoded with instructions that, when executed by the processor, cause the processor to recall the dispense-authorization data (and other data, such as the dispense-identification data) from the NFC data source, and to control the trigger control mechanism between the activated state and the deactivated state based on the dispense-authorization data. The trigger control mechanism is mounted in a body of the fluid dispensing meter and is controllable between an activated state, where the fluid dispensing meter can dispense fluid, and a deactivated state, where the fluid dispensing meter is prevented from dispensing fluid.

In step 402, a work order for a fluid dispense event is created. By way of example, a vehicle service department manager or parts department manager may create a fluid dispense work order on a computer with a processor, such as on system controller 14 (shown in FIGS. 1A, 2A, 3, and 7A). The work order includes dispense-authorization data, such as the type and amount of fluid to be dispensed.

In step 404, the dispense-authorization data is written to the NFC data source. The dispense-authorization data can be written to the NFC data source in any applicable manner. For example, the computer on which the work order was created can be linked to a NFC reader/writer, which is used to transmit the dispense-authorization data to the NFC chip.

In step 406, the NFC data source is placed within an operable proximity of the NFC data receiver of the fluid dispensing meter. With NFC data source within operable proximity, NFC data source is activated and transmits the dispense-authorization data to the fluid dispensing meter via the NFC data receiver. In some examples, the data transmission can be preceded by activating the fluid dispensing meter. For example, the dispensing meter may be asleep, and as such, may need to be awoken; or the NFC data receiver in the dispensing meter may need to be activated. Additionally, method 400 can include the user authentication steps as described in method 100 (FIG. 4), method 200 (FIG. 5), or method 300 (FIG. 6). The NFC data receiver transmits the dispense-authorization data to the control board, where the processor determines the authorization status of the fluid dispense event based on the dispense-authorization data.

In step 408, the dispense-authorization data provided in step 406 is compared to configuration data stored in the memory of the fluid dispensing meter. In step 410, the processor of the fluid dispensing meter determines an authorization status based on the dispense-authorization data. Initially, the processor can determine whether the dispense-authorization data includes sufficient information for a fluid dispense event. For example, the processor can be configured to accept the dispense-authorization data only if fluid type information is provided to ensure that the fluid dispensing meter can actually perform the requested fluid dispense. The processor compares the dispense-authorization data to configuration data recalled from the memory of the fluid dispensing meter to determine the authorization status of the fluid dispense event. In some examples, the processor can proceed straight to the comparison without checking for sufficient information. In such an example, the processor recognizes that there is insufficient information when making the comparison and can deny the fluid dispense based on that recognition. Alternatively, the authorization and/or denial can be based on additional authorization parameters (e.g., dispense volume information, user authorization status, etc.). If the dispense-authorization data is insufficient or not accepted, then the answer is NO and the fluid dispensing meter will not allow the user to dispense fluid with the fluid dispensing meter. If the dispense-authorization data is sufficient and accepted, then the answer is YES and method 400 proceeds to step 410.

In step 412, if the fluid dispense is authorized, the processor causes the trigger control mechanism to enter the activated state. With the trigger control mechanism in the activated state, the user is able to depress the trigger and dispense fluid from the fluid dispensing meter. In step 414, the fluid is dispensed from the fluid dispensing meter. In some examples, the processor can cause the trigger control mechanism to shift back to the deactivated state based on the dispense-authorization data. As discussed above, the dispense-authorization data can include dispense volume information. A sensor disposed in the fluid dispensing meter senses the volumetric fluid flow through the fluid dispensing meter. The sensor generates a volumetric flow count and provides that volumetric flow count to the processor. The processor can cause the trigger control mechanism to reenter the deactivated state based on the volumetric flow count reaching the dispense volume. Some embodiments may also allow reporting of the fluid dispense, such as writing the dispense results back onto the NFC chip, storing the dispense results in the dispensing meter memory until such time a data migration is performed, or transmitting the dispense results via a Wi-Fi network (if the dispensing meter is equipped with a Wi-Fi antenna and connected to the network).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid dispensing meter configured for dispensing automotive fluids, the dispensing meter comprising:
a handle supporting a body of the fluid dispensing meter, the handle configured to be grasped by at least one hand of a user;
a trigger associated with a valve disposed within the body of the fluid dispensing meter, the trigger configured to actuate the valve between an open state and a closed state;
a trigger control mechanism disposed in the body of the fluid dispensing meter, the trigger control mechanism controllable between an activated state, where the trigger can actuate the valve to the open state, and a deactivated state, where the trigger is prevented from actuating the valve to the open state;
a near field communications (NFC) data receiver disposed in the fluid dispensing meter, the NFC data receiver configured to receive data from an external data source; and
a control board disposed in the fluid dispensing meter, the control board comprising:
a processor; and
a memory encoded with instructions that, when executed by the processor, cause the processor to:
recall configuration data from the memory, the configuration data including a fluid type associated with the fluid meter;
compare the configuration data to dispense-authorization data received from the external data source; and
control the trigger control mechanism between the activated state and the deactivated state based on the comparison of the configuration data and the dispense-authorization data.

2. The fluid dispensing meter of claim 1, wherein the dispense-authorization data includes dispense volume information.

3. The fluid dispensing meter of claim 1, wherein the data from the external data source is configuration data, and wherein the configuration data is stored in the memory.

4. The fluid dispensing meter of claim 3, wherein the initial communication data is stored in a read-only format on the memory.

5. The fluid dispensing meter of claim 4, wherein the initial communication data is stored in the read-only format for a set time period.

6. The fluid dispensing meter of claim 5, wherein the initial communication data is converted to a read-write format after the set time period.

7. A fluid management system comprising:
a near field communication (NFC) programming unit;
an NFC data source, the NFC data source configured to receive dispense data from the NFC programming unit; and
the fluid dispensing meter of claim 1.

8. The fluid management system of claim 7, wherein the dispense data is stored on the NFC data source in a read-only format.

9. The fluid management system of claim 7, wherein the dispense data is stored on the NFC data source in a read-write format.

10. The fluid management system of claim 7, wherein the NFC programming unit is a system controller.

11. The fluid management system of claim 7, wherein the processor is configured to control the trigger control mechanism between the activated state and the deactivated state based only on information recalled from memory and the dispense data received from the NFC data source.

12. The fluid management system of claim 7, wherein the dispense-authorization data further includes dispense volume information.

13. The fluid dispensing meter of claim 1, wherein the fluid dispensing meter is configured to communicate with a first external data source forming the external data source, and with a second external data source.

* * * * *